US012572900B1

(12) United States Patent
Williamson et al.

(10) Patent No.:     US 12,572,900 B1
(45) Date of Patent:        Mar. 10, 2026

(54) DECENTRALIZED SOCIAL-MEDIA PLATFORM WITH SELF-EMPOWERED COMMUNITIES

(71) Applicant: Reddit, Inc., San Francisco, CA (US)

(72) Inventors: Matt Williamson, Seattle, WA (US); Niraj Sheth, Goa (IN); Rahul Kothari, London (GB); Anton Galchenko, London (GB); Oleksii Pavlovskyi, New York, NY (US); Tim Tickel, San Mateo, CA (US); James Jia, San Diego, CA (US); Julie Krosnicki, Guilford, CT (US)

(73) Assignee: Reddit, Inc., San Francisco, CA (US)

( * ) Notice: Subject to any disclaimer, the term of this patent is extended or adjusted under 35 U.S.C. 154(b) by 38 days.

(21) Appl. No.: 18/601,232

(22) Filed: Mar. 11, 2024

Related U.S. Application Data

(60) Provisional application No. 63/489,662, filed on Mar. 10, 2023.

(51) Int. Cl.
  *G06Q 50/00*        (2012.01)
  *G06Q 20/38*        (2012.01)
         (Continued)
(52) U.S. Cl.
  CPC ........... *G06Q 50/01* (2013.01); *G06Q 20/389* (2013.01); *G06Q 30/0233* (2013.01); *H04L 63/083* (2013.01)
(58) Field of Classification Search
  CPC ............................... G06Q 50/01; H04L 63/083
  See application file for complete search history.

(56)             References Cited

U.S. PATENT DOCUMENTS

| | | | | |
|---|---|---|---|---|
| 11,842,317 | B2 * | 12/2023 | Heath .............. | G06Q 10/08355 |
| 2020/0160326 | A1 * | 5/2020 | Sarin .................... | G06Q 20/102 |

(Continued)

OTHER PUBLICATIONS

Arminvanbuuren.com [online], "Armin's All Access," available on or before Nov. 30, 2022, via Internet Archive: Wayback Machine URL<https://web.archive.org/web/20221130151533/https://aaa.arminvanbuuren.com/>, retrieved on Jun. 13, 2025, retrieved from URL<https://aaa.arminvanbuuren.com/>, 6 pages.

(Continued)

*Primary Examiner* — Scott C Anderson
(74) *Attorney, Agent, or Firm* — Fish & Richardson P.C.

(57)             ABSTRACT

Methods, systems, and apparatus including computer programs encoded on computer storage media for implementing a decentralized social-media network. The system platform servers of a social-media platform and a stand-alone client, instances of which are downloadable to and executable on devices of end users to interface with the platform servers. The servers have computer-executable instructions to compute a measure of reputation based on engagements within a community, including moderation work of community content, and based on highly idiosyncratic community-specific rules. The stand-alone client has computer-executable instructions to generate and store a public-private key pair, which is accomplished to the exclusion of the servers. The key pair enables recording of the measure of reputation and related changes on decentralized computing resources in a way that is verifiable. The system can port the measure of reputation off-platform in a way that ensures data coherency and data fidelity amongst data stores of the system.

26 Claims, 11 Drawing Sheets

(51) Int. Cl.
  *G06Q 30/0226*        (2023.01)
  *H04L 9/40*          (2022.01)

(56)            References Cited

U.S. PATENT DOCUMENTS

2023/0252419 A1 *  8/2023  Stewart .................. G06N 20/00
                                            705/321
2023/0281604 A1 *  9/2023  Robell ................. G06Q 30/018

OTHER PUBLICATIONS

Blog.ethereum.org [online], "Ethereum's energy usage will soon decrease by ~99.95%," available on or before Mar. 9, 2023, via Internet Archive: Wayback Machine URL<https://web.archive.org/web/20230309025918/https://blog.ethereum.org/2021/05/18/country-power-no-more>, retrieved on Jun. 16, 2025, retrieved from URL<https://blog.ethereum.org/2021/05/18/country-power-no-more>, 5 pages.
Corinstitute.co [online], "FAQS," available on or before Jan. 25, 2023, via Internet Archive: Wayback Machine URL<https://web.archive.org/web/20230125135043/https://corinstitute.co/faq>, retrieved on Jun. 16, 2025, retrieved from URL<https://corinstitute.co/>, 2 pages.
Docs.arbitrum.io [online], "A gentle introduction to Arbitrum," available on or before Feb. 29, 2024, via Internet Archive: Wayback Machine URL<https://web.archive.org/web/20240229060113/https://docs.arbitrum.io/welcome/arbitrum-gentle-introduction>, retrieved on Jun. 16, 2025, retrieved from URL<https://docs.arbitrum.io/welcome/arbitrum-gentle-introduction>, 5 pages.
Docs.arbitrum.io [online], "Monitoring tools and block explorers," available on or before Oct. 9, 2024, via Internet Archive: Wayback Machine URL<https://web.archive.org/web/20241009160242/https://docs.arbitrum.io/build-decentralized-apps/reference/monitoring-tools-block-explorers>, retrieved on Jun. 16, 2025, retrieved from URL<https://docs.arbitrum.io/build-decentralized-apps/reference/monitoring-tools-block-explorers>, 2 pages.
Docs.arbitrum.io [online], "Any Trust Protocol," available on or before Jan. 16, 2025, via Internet Archive: Wayback Machine URL<https://web.archive.org/web/20250116151430/https://docs.arbitrum.io/how-arbitrum-works/anytrust-protocol>, retrieved on Jun. 13, 2025, retrieved from URL<https://docs.arbitrum.io/how-arbitrum-works/anytrust-protocol>, 4 pages.
Docs.etherscan.io [online], "Introduction," available on or before Oct. 4, 2024, via Internet Archive: Wayback Machine URL<https://web.archive.org/web/20241004190702/https://docs.etherscan.io/etherscan-v2>, retrieved on Jun. 16, 2025, retrieved from URL<https://docs.etherscan.io/etherscan-v2>, 1 page.
Docs.openzeppellin.com [online], "ERC 20," available on or before Mar. 7, 2023, via Internet Archive: Wayback Machine URL<https://web.archive.org/web/20230307084301/https://docs.openzeppelin.com/contracts/2.x/api/token/erc20>, retrieved on Jun. 13, 2025, retrieved from URL<https://docs.openzeppelin.com/contracts/2.x/api/token/erc20>, 15 pages.
Docs.walletconnect.com [online], "WalletConnect Docs," available on or before Mar. 7, 2023, via Internet Archive: Wayback Machine URL<https://web.archive.org/web/20230307104656/https://docs.walletconnect.com/2.0/#getting-started>, retrieved on Jun. 13, 2025, retrieved from URL<https://docs.walletconnect.com/>, 2 pages.
eips.ethereum.org [online], "ERC-4361: Sign-In with Ethereum," available on or before Feb. 19, 2023, via Internet Archive: Wayback Machine URL<https://web.archive.org/web/20230219230200/https://eips.ethereum.org/EIPS/eip-4361>, retrieved on Jun. 13, 2025, retrieved from URL<https://eips.ethereum.org/EIPS/eip-4361>, 9 pages.
ethereum.org [online], "What is Ethereum?," available on or before Mar. 6, 2023, via Internet Archive: Wayback Machine URL<https://web.archive.org/web/20230306114835/https://ethereum.org/en/what-is-ethereum/>, retrieved on Jun. 13, 2025, retrieved from URL<https://ethereum.org/en/what-is-ethereum/>, 20 pages.

github.com [online], "BigInt," available on or before Dec. 12, 2022, via Internet Archive: Wayback Machine URL<https://web.archive.org/web/20221212150730/https://github.com/attaswift/BigInt>, retrieved on Jun. 13, 2025, retrieved from URL<https://github.com/attaswift/BigInt>, 7 pages.
github.com [online], "CryptoSwift," available on or before Dec. 31, 2022, via Internet Archive: Wayback Machine URL<https://web.archive.org/web/20221231154451/https://github.com/krzyzanowskim/CryptoSwift>, retrieved on Jun. 13, 2025, retrieved from URL<https://github.com/krzyzanowskim/CryptoSwift>, 14 pages.
github.com [online], "Execution API Specification; JSON-RPC," available on or before Mar. 4, 2023, via Internet Archive: Wayback Machine URL<https://web.archive.org/web/20230304224354/https://github.com/ethereum/execution-apis>, retrieved on Jun. 13, 2025, retrieved from URL<https://github.com/ethereum/execution-apis>, 3 pages.
github.com [online], "Hierarchical Deterministic Wallets," available on or before Mar. 6, 2023, via Internet Archive: Wayback Machine URL<https://web.archive.org/web/20230306023233/https://github.com/bitcoin/bips/blob/master/bip-0032.mediawiki>, retrieved on Jun. 13, 2025, retrieved from URL<https://github.com/bitcoin/bips/blob/master/bip-0032.mediawiki>, 11 pages.
github.com [online], "Mnemonic code for generating deterministic keys," available on or before Feb. 26, 2023, via Internet Archive: Wayback Machine URL<https://web.archive.org/web/20230226052321/https://github.com/bitcoin/bips/blob/master/bip-0039.mediawiki>, retrieved on Jun. 13, 2025, retrieved from URL<https://github.com/bitcoin/bips/blob/master/bip-0039.mediawiki>, 5 pages.
github.com [online], "Multi-Account Hierarchy for Deterministic Wallets," available on or before Mar. 7, 2023, via Internet Archive: Wayback Machine URL<https://web.archive.org/web/20230307222516/https://github.com/bitcoin/bips/blob/master/bip-0044.mediawiki>, retrieved on Jun. 13, 2025, retrieved from URL<https://github.com/bitcoin/bips/blob/master/bip-0044.mediawiki>, 4 pages.
github.com [online], "Operator Filter Registry," available on or before Jan. 28, 2023, via Internet Archive: Wayback Machine URL<https://web.archive.org/web/20230128110213/https://github.com/ProjectOpenSea/operator-filter-registry>, retrieved on Jun. 13, 2025, retrieved from URL<https://github.com/ProjectOpenSea/operator-filter-registry>, 10 pages.
github.com [online], "secp256k1," available on or before Aug. 23, 2022, via Internet Archive: Wayback Machine URL<https://web.archive.org/web/20220823091202/https://github.com/Boilertalk/secp256k1.swift>, retrieved on Jun. 13, 2025, retrieved from URL<https://github.com/Boilertalk/secp256k1.swift>, 3 pages.
github.com [online], "Web3 Secret Storage Definition," available on or before Nov. 22, 2022, via Internet Archive: Wayback Machine URL<https://web.archive.org/web/20221122175904/https://github.com/ethereum/wiki/wiki/Web3-Secret-Storage-Definition>, retrieved on Jun. 13, 2025, retrieved from URL<https://github.com/ethereum/wiki/wiki/Web3-Secret-Storage-Definition>, 6 pages.
github.com [online], "Web3," available on or before Oct. 24, 2022, via Internet Archive: Wayback Machine URL<https://web.archive.org/web/20221024050114/https://github.com/Boilertalk/Web3.swift>, retrieved on Oct. 24, 2022, retrieved from URL<https://github.com/Boilertalk/Web3.swift]>, 9 pages.
Infura.io [online], "Four Years of Uptime," Sep. 21, 2020, retrieved on Jun. 16, 2025, retrieved from URL<https://www.infura.io/blog/post/four-years-of-uptime>, 12 pages.
medium.com [online], "EIP712 is here: What to expect and how to use it," Sep. 18, 2018, retrieved on Jun. 13, 2025, retrieved from URL<https://medium.com/metamask/eip712-is-coming-what-to-expect-and-how-to-use-it-bb92fdla7a26>, 18 pages.
reddit.com [online], "15,000 karma cap on Moon distribution.," available on or before Feb. 15, 2023, via Internet Archive: Wayback Machine URL<https://web.archive.org/web/20230215063143/https://www.reddit.com/r/CryptoCurrency/comments/mrn758/15000_karma_cap_on_moon_distribution/>, retrieved on Jun. 17, 2025, retrieved from URL<https://www.reddit.com/r/CryptoCurrency/comments/mrn758/15000_karma_cap_on_moon_distribution/>, 3 pages.
reddit.com [online], "Limit post karma to 1k and limit comment karma to 1k per comment," available on or before Mar. 8, 2023, via Internet Archive: Wayback Machine URL<https://web.archive.org/

(56) References Cited

OTHER PUBLICATIONS web/20230308234609/https://www.reddit.com/r/CryptoCurrency/comments/lm8she/limit_post_karma_to_1k_and_limit_comment_karma_to/>, retrieved on Jun. 17, 2025, retrieved from URL<https://www.reddit.com/r/CryptoCurrency/comments/lm8she/limit_post_karma_to_1k_and_limit_comment_karma_to/>, 3 pages.

reddit.com [online], "Reddit announces partnership with the Ethereum Foundation," available on or before Jan. 8, 2023, via Internet Archive: Wayback Machine URL<https://web.archive.org/web/20230108042014/https://www.reddit.com/r/ethereum/comments/16c3kx/reddit_announces_partnership_with_the_ethereum/>, retrieved on Jun. 17, 2025, retrieved from URL<https://www.reddit.com/r/ethereum/comments/16c3kx/reddit_announces_partnership_with_the_ethereum/>, 4 pages.

redditinc.com [online], "Previews Terms of Use," available on or before Feb. 1, 2023, via Internet Archive: Wayback Machine URL<https://web.archive.org/web/20230201234721/https://redditinc.com/policies/previews-terms>, retrieved on Jun. 16, 2025, retrieved from URL<https://redditinc.com/policies/previews-terms>, 6 pages.

redditinc.com [online], "Reddit Rules," available on or before Jan. 13, 2025, via Internet Archive: Wayback Machine URL<https://web.archive.org/web/20250113163117/https://redditinc.com/policies/reddit-rules>, retrieved on Jun. 16, 2025, retrieved from URL<https://redditinc.com/policies/reddit-rules>, 3 pages.

reddit.com [online], "MOON Proposal: Double Comment Karma," available on or before Mar. 8, 2023, via Internet Archive: Wayback Machine URL<https://web.archive.org/web/20230308234609/https://www.reddit.com/r/CryptoCurrency/comments/k12wnd/moon_proposal_double_comment_karma/>, retrieved on Jun. 17, 2025, retrieved from URL<https://www.reddit.com/r/CryptoCurrency/comments/k12wnd/moon_proposal_double_comment_karma/>, 3 pages.

support.reddithelp.com [online], "What is the blockchain and how does it work?," available on or before Feb. 24, 2024, via Internet Archive: Wayback Machine URL<https://web.archive.org/web/20240224161451/https://support.reddithelp.com/hc/en-us/articles/7556522726292-What-is-the-blockchain-and-how-does-it-work>, retrieved on Jun. 16, 2025, retrieved from URL<https://support.reddithelp.com/hc/en-us/articles/7556522726292-What-is-the-blockchain-and-how-does-it-work>, 3 pages.

* cited by examiner

402 — Retrieve contribution information

404 — Compute baseline scores

406 — Compute final scores and allocation

408 — Publish allocation file

410 — Community validates allocation

412 — Platform signs allocation file and stores on blockchain

414 — Distribute community points and record transfers on blockchain

502 Retrieve contribution information

504 Virtual machine receives request and appends to block

506 Virtual machine broadcasts block to nodes

508 Nodes validates

510 Nodes gets due gas

512 Virtual machine adds block to blockchain and broadcast update

DECENTRALIZED SOCIAL-MEDIA PLATFORM WITH SELF-EMPOWERED COMMUNITIES

CROSS-REFERENCE TO RELATED APPLICATIONS

This application claims the benefit under 35 U.S.C. § 119 (e) of the filing date of U.S. Patent Application No. 63/489, 662 filed on Mar. 10, 2023, which is incorporated here by reference.

BACKGROUND

This specification generally relates to information retrieval and distribution over networked computing devices in the context of social media.

Social-media networks include one or more platforms, mobile, and web clients, instances of which are downloadable to end-user devices. An end user, also referred to herein as a member, elects to join one or more communities hosted on the platform. A community is generally an association of members who share common interests and, in some cases, values. Community membership can be open to all who have access to the platform or alternatively closed, in which case membership is by invitation only or by qualification.

SUMMARY

A social-media platform in accordance with aspects of the invention empowers each of its communities, which can number in the thousands and which can be highly idiosyncratic, to be independent and autonomous. Rules particular to a community are user-generated content and, furthermore, enforce not only trust and safety, but also community culture. Measures of a member's reputation, influence, and/ or contribution are computed based on rules of and interactions with a particular community and hence are bespoke to that community. What is appropriate in one community may not be welcomed in another. Community rules and other community-specific information, primitive as well as processed, are leveraged to ensure not only high-quality content, but also culturally appropriate content. Moreover, the platform leverages rich clients to provide functionalities that enable and facilitate a community's social fabric to be portable off platform, which notably does not require platform authorization, thereby supporting community autonomy and independence, and which mitigates problems customary to cold starts, e.g., when there is insufficient information about a new member to select information for the member. The entirety or only aspects of the social fabric can be ported securely off platform by decentralized mechanisms that ensure data coherency and data fidelity. Third-party applications, including third-party client applications for the platform that supplements the platform with additional features and functionalities, can retrieve and use aspects of the social fabric that was ported off platform to enable or improve the additional features and functionalities.

In general, one innovative aspect of the subject matter described in this specification can be embodied in a system implementing a decentralized social-media network. The system includes one or more platform servers of a social-media platform and a stand-alone client, instances of which are downloadable to and executable on devices of end users to interface with the one or more platform servers. The one or more platform servers have computer-executable instructions stored on tangible media to: in response to a request to register an end user with the platform, where the request is received from an instance of the stand-alone client executing on a device of an end user, assign an identifier unique to the end user and communicate with the stand-alone client instance to validate a password and store the password in a user data object that is referenced by the identifier, in response to a request by the end user to join a community of multiple communities of the network, where the request is received from the stand-alone client instance, add the end user's assigned identifier to a stored list of members of the community and include a reference to the community in the user data object, receive, from the stand-alone client instance, engagements of the user with the community and store the engagements as engagement data objects, where engagements include one or more of posting content, commenting on content, upvoting content, downvoting content, moderating content, polling, responding to polls, contributing to rules for the community, moderating live sessions, and hosting live sessions, and where each of the engagement data objects include its own unique identifier and a reference to the end user's identifier, in response to a notification from the stand-alone client instance that the end user has a public key for a blockchain, store the public key in the user data object, thereby linking the end user's identifier and public key in the system, compute a reputation measure of the end user based on the engagement data objects and store the reputation measure in the data object for the user, and crawl the blockchain to retrieve information from records that are associated with the end user's public key, including records that include information about the end user's reputation measure. The stand-alone client has computer-executable instructions stored on tangible media to: in response to receiving a request to register with the platform, where the request is received from the end user via a user interface of the stand-alone client and includes the password, communicate with the servers of the platform to validate and store the password, receive an indication the password is valid from the servers, and provide an indication that registration is complete to the end user via the user interface, in response to receiving an election to join a community on the platform, where the election is received from the end user via the user interface, communicate with the servers about the election, receive information about the community from the servers, and provide the information to the end user via the user interface, communicate with the servers to implement engagements by the end user with the community, in response to a request to create an account on the blockchain, where the request is from the end user and received via the user interface, (i) generate a public-private key pair for the blockchain account and (ii) transmit a public key of the pair and the end user's identifier to the servers, where instructions to generate a private key of the pair are executed on an end user device to the exclusion of the servers, whereby the servers do not have access to the private key or processes by which it is generated, and retrieve the reputation measure of the end user from the server and record the reputation measure on the blockchain, where a record of the reputation measure is accessible to another social-media platform, which has access to the user's public key, whereby reputation measure of the user is portable to the other social-media platform, and whereby data coherency and data fidelity of the reputation measure are preserved.

The foregoing and other embodiments can each optionally include one or more of the following features, alone or in combination. In particular, one embodiment includes all the following features in combination. In some implementations, the one or more platform servers further includes computer-executable instructions to perform a distribution of community points to the end user, where instructions to distribute the community points includes: computing, at a point in time, a contribution measure based on the engagement data objects, where moderation of content for the community in accordance with community-specific rules enhances the contribution measure, computing, at the point in time, the end user's allocation of the community points being distributed to the community, where the end user's allocation for the distribution of community points is computed based on the contribution measure for the end user at the point in time, distributing the computed allocation of community points to the end user and recording the distribution on the blockchain, where a record of distribution on the blockchain specifies an amount of community points the end user gained and the end user's public key, whereby the record is accessible to the other social-media platform, and crawl the blockchain to retrieve information from records that are associated with the end user's public key and, furthermore, by which community points are transferred, and compute a current tally of community points for the end user based on the information retrieved.

In some implementations, the engagement data objects include references to each other, whereby the references represent a chronicle of the end user's engagements. In some implementations, the end user is a first end user, the first end user's engagements include one of commenting, upvoting, downvoting, reposting, and moderating a post of a second end user on the platform, where the post of the second end user is stored as an engagement data object of the second end user, and the engagement data objects of the first end user include references to the engagement data object of the second end user, whereby the references further represent a chronicle of the first and second end users' engagements.

In some implementations, the stand-alone client further includes computer-executable instructions to record on the blockchain the data objects of the first end user in response to a request from the first end user, or the server further includes computer-executable instructions to record on the blockchain the data objects of the first end user.

In some implementations, computing the contribution measure of the end user includes computing a karma score for the end user based on the engagements of the end user, where the karma score is a baseline score applicable platform-wide, and computing a contribution score for the end user by applying rules specific to the community to change the karma score. The rules can be stored in a smart contract on the blockchain.

In some implementations, the reputation measure is based on upvotes and downvotes received for posts and comments of the end user on the platform.

In some implementations, the servers further include computer-executable instructions stored on tangible media to: publish, to the community, a distribution file that includes the computed contribution score and allocation of community points for the community to validate, and responsive to the community validation, sign the distribution file and record it on the blockchain. The servers can further include computer-executable instructions stored on tangible media to: compute measures of contribution and allocations for other members in the community, and include in the distribution file the computed measures of contribution and allocations for other members.

In some implementations, the stand-alone client instance further includes computer-executable instructions stored on tangible media to: responsive to a user election to transfer a portion of the community points owned by the user, communicate with a virtual machine of the blockchain to execute and record the transfer on the blockchain.

In some implementations, the one or more servers further include computer-executable instructions stored on tangible media to: responsive to a selection of an avatar by the end user, generate a programmable token from a smart contract associated with the avatar that represents the end user's rights to the avatar, where the end user's rights are one or more rights that are associated with the avatar, and communicate with a virtual machine of the blockchain to transfer the end user's rights by transferring the generated programmable token corresponding to the avatar that represents such rights to the end user's blockchain account and record the transfer on the blockchain. The avatar can include features, and where instructions to generate the avatar includes instructions to: responsive to user input, select one or more of the features and define their respective appearances and functionalities, as constrained by the end user's rights to the avatar defined by the smart contract corresponding to the avatar.

In some implementations, functionalities include authentication of postings of content to the community, an authenticated posting verifies that the content at issue was posted by the end user. The stand-alone client instance can further include computer-executable instructions stored on tangible media to: sign content to be posted by the end user with the end user's private key, and send the signed content to the virtual machine of the blockchain for execution and recording as a transaction block on the blockchain, and the one or more platform servers can further include computer-executable instructions stored on tangible media to: retrieve the signed content when it crawls the blockchain, distribute the signed content on the platform, and log the distribution as engagement for community point computation.

In some implementations, functionalities include an additional authentication functionality of the end user's identity on the platform, and where the one or more servers further include computer-executable instructions stored on tangible media to: generate, from the additional authentication functionality of the avatar, a verifiable credential for the end user and record information about the verifiable credential on the blockchain.

In some implementations, the stand-alone client further includes computer-executable instructions stored on tangible media to: responsive to a request received via the user interface to transfer the rights the end user has to the avatar to another user, communicate with the virtual machine to transfer the rights by transferring the programmable token representing such rights and record the transfer on the blockchain. The transfer of rights can be performed to the exclusion of the one or more servers of the platform. The one or more servers can further include computer-executable instructions stored on tangible media to: detect the transfer of rights from records that are retrieved by crawling the blockchain and that are referenced by the end user's public key, update datastores of the platform to reflect the transfer of rights, thereby preserving data coherency for the avatar, and remove uses of the avatar by the end user on the platform in accordance with the transfer of rights.

In some implementations, the avatar includes a rendering-model object, and the one or more servers further include computer-executable instructions stored on tangible media to: responsive to a selection by the end user of one or more other rendering-model objects that digitally implement avatar artwork, generate one or more respective programmable tokens for the selected rendering-model objects, where the generated programmable tokens specify rights for their respective rendering-model objects, transfer the rights for the selected rendering-model objects to the end user through the generated programmable tokens and record the transfer on the blockchain, and render the avatar in combination with the avatar artwork to which the end user has rights in accordance with those rights, where a rendering engine uses the rendering-model objects to render.

In some implementations, the one or more servers further include computer-executable instructions stored on tangible media to: calculate, by crawling (i) the blockchain, (ii) platform data of the platform, or (iii) a combination thereof, a cumulative amount of community points earned by the end user over a lifetime of engagements with the community, and send the cumulative amount of community points calculated to the stand-alone client instance for display. The stand-alone client can further include computer-executable instructions stored on tangible media to: receive and display on the user interface the cumulative amount of community points calculated along with the current tally of community points.

In some implementations, the one or more servers further include computer-executable instructions stored on tangible media to: weight input from the end user based on the current tally of community points, where input includes one of upvoting content, downvoting content, upvoting a governance rule, and downvoting a governance rule.

In some implementations, the one or more servers further include computer-executable instructions stored on tangible media to: responsive to a request from the end user to redeem community points for goods and services on the platform, award the requested goods and services to the end user based on community points in exchange for an amount of community points required for the requested goods and services, where goods and services include a special membership subscription, in-platform currency, badges, or animated emojis, and communicate with a virtual machine of the blockchain to record the redemption on the blockchain.

In some implementations, the one or more servers further include computer-executable instructions stored on tangible media to: award platform-wide programmable tokens and community-specific programmable tokens, where platform-wide programmable tokens are usable across communities of the platform and community-specific programmable tokens are usable only in their respective communities, and where one or more of the platform-wide programmable tokens and community-specific programmable tokens are usable across different platforms.

In some implementations, the system further includes a virtual machine on a Layer 2 of the blockchain, where the virtual machine includes computer-executable instructions stored on tangible media to: execute transactions for the servers and stand-alone client instances, validate the transactions by a blockchain consensus mechanism, and record the validated transactions on the blockchain.

In some implementations, the one or more servers further include computer-executable instructions stored on tangible media to: tally virtual goods given to the end user by other users of the platform, tally upvotes and downvotes given to the end user by the other users, and compute a value of a contribution allocation corresponding to the end user's contribution to the platform, where the contribution allocation is computed based on the tallies. The upvotes and downvotes can be given for engagements of the end user with the community and thereby are specific to the community.

In general, another innovative aspect of the subject matter described in this specification can be embodied in a computer-program product for participation in a decentralized social-media network. The product being a mobile-client stored on tangible media and including instructions executable by a stand-alone device of an end user to: responsive to receiving a request to register with a social-media platform of the network, where the request is received from the end user via a user interface on the device, communicate with a server of the platform to implement the request and store on memory of the device an ID unique to the end user, responsive to receiving a request to create a blockchain account, where the request is received from the end user via the user interface, generate a public-private key pair and communicate with the server to link a public key of the pair with the ID unique to the end user, where instructions to generate a private key of the pair are executed by the stand-alone device to the exclusion of the server, and where the private key is stored locally on the device in memory that is inaccessible to the server, whereby the platform does not have access to the private key or processes by which it is generated, responsive to receiving, via the user interface, an election by the end user to join a community on the platform, communicate with the server to implement the election, communicate with the server to implement engagements by the end user within the community, where engagements include one or more of posting content, commenting on content, upvoting content, downvoting content, moderating content, polling, responding to polls, contributing to rules for the community, moderating live sessions, and hosting live sessions, prompt the server to compute a measure of contribution for the end user, where the measure is computed based on one or more of the engagements, responsive to a request by the end user to acquire rights to an avatar digitally implemented as one or more data objects including a rendering model object, where the rights are specified by a programmable token stored on the blockchain, prompt the server to implemented the request for the end user to acquire the rights to the avatar, and cause a record to be stored on the blockchain that specifies any one of the ID that is unique to the end user, the community to which the end user joined, one or more of the engagements of the end user, the computed measure of contribution, and the rights to the avatar acquired by the end user, where the record is identifiable by the public key, whereby information specified by the record is portable off the social-media platform.

The foregoing and other embodiments can each optionally include one or more of the following features, alone or in combination. In some implementations, one or more of the engagements earn an allocation of community points periodically that are specific to a community and are distributed by the community itself or the platform, and where community points represent and are an indicator of reputation for the end user, the computer-program product further including instructions to: receive from the server, a number of community points distributed to the end user, and record the distribution on the blockchain, where a record of the distribution of community points references the end user public key, and where the record is accessible off platform, whereby the record can be located off platform by searching for the public key.

In some implementations, the computer-program product further includes instructions to: responsive to a request by the end user to transfer community points to another party, record the transfer on the blockchain, where the transfer can be effected to the exclusion of the server.

In some implementations, a smart contract stored on the blockchain specifies rules governing community point transfers, where a virtual machine of the blockchain applies the rules to execute community point transfers, and where instructions to transfer and record community points include instructions to: sign with the private key a request to execute the transfer, and send the signed request to the virtual machine for execution in accordance with the rules of the smart contract, where the signed request references the smart contract.

In some implementations, a smart contract stored on the blockchain specifies rules governing community point transfers, where instructions to transfer and record the transaction include instructions to: retrieve the smart contract from the blockchain, compute, based on the rules specified by the smart contract, a current tally of community points for the end user, and display the current tally of community points in the user interface.

In some implementations, a smart contract stored on the blockchain provides rules for community point distribution based on community engagement, where the rules are particular to the community, and where community point distribution is responsive to a prompt, from the stand-alone device that includes a reference to the smart contract. The rules can be defined by community members, and the product can further include instructions to: receive user input for changing the rules of the smart contract, and update the smart contract on the blockchain with the rule changes.

In some implementation, instructions for public-private key pair generation includes instructions to generate a recovery phrase, the product further including instructions to: receive, via the user interface, end user input that specifies a password for the recovery phrase, encrypt the recovery phrase with the password received, transmit the encrypted recovery phrase to the server for storage, communicate with the server to retrieve the encrypted recovery phrase, decrypt the retrieved recovery phrase with the password, display, on the user interface, the decrypted recovery phrase, and regenerate a lost public-private key pair from the decrypted recovery phrase.

In some implementations, content includes live streaming of text, video, or audio.

In some implementations, the avatar is a collectible avatar that is acquired by purchase, the product further includes instructions to: responsive to input from the end user selecting one or more avatar features, communicate with the server to generate a second avatar including one or more data objects including a rendering model object for the second avatar in accordance with the selected avatar features, which specify particular appearance and functionality that customize the second avatar.

In some implementations, the computer-program product further includes instructions to: receive from the platform server a number of community points needed to be redeemed to generate the second avatar, and deduct the received number of points and update the current tally of community points of the end user.

In some implementations, the instructions to prompt the server to acquire rights to the avatar include instructions to: communicate with the server to display, on the user interface, renderings of avatars available for acquisition, where avatars are implemented digitally by a rendering model object and, furthermore, to which there are rights available for transfer, where the rights are specified in a programmable token stored on the blockchain, and responsive to user input from the end user selecting one of the displayed avatars, communicate with the server to transfer rights of the selected avatar through its programmable token on the blockchain.

In some implementations, the end user has platform tokens that are acceptable as stored value, prepaid access, or any other payment instrument required to transfer the rights for the selected avatar, the product further includes instructions to communicate with the server to transfer platform tokens as stored value, prepaid access, or any other payment instrument.

In some implementations, the computer-program product further includes instructions to: responsive to input from the end user requesting connection to off-platform blockchain keys that are compatible with the blockchain, connecting to the off-platform blockchain keys in lieu of generating new blockchain keys, where off-platform keys are generated through third-party applications, whereby the off-platform keys can be used for transactions on platform.

Implementation of aspects of the invention provides many advantages, examples of which are described below. Community rules of governance, member reputation, contribution, and influence are bespoke to a community and hence not only sustains, but also enhances idiosyncratic community culture, including its content and how its members interact. Any and all of this community information can be ported amongst a social-media network of multiple platforms implementing aspects of the invention. Smart contracts, community points, avatars, and other fungible and non-fungible programmable tokens are separately transferable independent of platform control. Moreover, client applications of third parties can access, retrieve, and use any combination of aspects of community information to implement their respective functionalities. For example, a third-party platform application that provides additional functionality to those offered by the platform can leverage the community information to enable or improve the additional functionality. A third-party gaming application can use a member's avatar in the game for which gameplay includes renderings of avatars.

Information, programmable tokens, and any other aspects of a community and its members can be ported in a way that precludes data coherency problems, data tampering problems, and other misfortune and misdeeds. Security mechanisms are decentralized, which removes single-point failures and thereby enhances security as well as autonomy and independence. Consequently, one can have confidence in the fidelity of the information and/or assets ported, which is especially advantageous when porting information and/or assets that may have required significant resources to cultivate. Where applicable, data structures used to store information are platform agnostic or easily adaptable such that functionalities are not degraded when information and/or assets have been ported.

Besides the benefits of portability across the social-media network while maintaining security and independence benefits of public blockchains, implementation of aspects of the invention makes engagements and transactions user friendly and low friction. For example, public-key creation (accomplished through a blockchain public-private key pair for community members that is provided by the platform) in conjunction with preclusion of platform access to private keys (or the process by which they are generated) balances ease of use with security and self-governance. Members need not remember public or private keys to transact programmable tokens, only platform IDs, usually much easier to recall. Likewise, recovery phrase backup, for which the platform stores only encrypted phrases and/or passwords and has no other access to the phrases and/or passwords, provides a user-friendly way to prevent members from easily losing their private keys, a common occurrence.

Other user-friendly and low friction aspects of the invention include the following. If a member sees content they like, e.g., in a community dedicated to discussing narwhals, they can simply tap on the content poster's username and give the poster community points, which in one implementation are reputation and influence points that are specific to a community. These community points generally can be verified on compatible blockchains via fungible programmable tokens and hence transactions in community points can be recorded on a blockchain. Besides community points, other forms of programmable tokens can be given, including non-fungible programmable tokens. Platform tokens can also be given, e.g., one called gold, which is a virtual good that can be awarded by one user to another user, e.g., as described in reference to FIG. 11. Unlike programmable tokens, platform tokens are not blockchain enabled. Members can also easily endorse the content, e.g., by simply clicking on an icon for upvoting the content. Optionally, members can also give other virtual goods to show appreciation of content.

In general, virtual goods are digital assets that are stored on servers and, furthermore, include one or more elements related to artwork, as well as data specifying rights of use associated with the artwork. A virtual good need not, but can have an associated programmable token on the blockchain, in which case the virtual goods are verifiable with respect to ownership and other interests. Examples of verifiable virtual goods include avatars that are programmable tokens. These avatars can include fungible or non-fungible programmable tokens, or other configurations of programmable tokens, e.g., semi-fungible. Fungible programmable tokens are identical and have the same properties. Comparatively, non-fungible programmable tokens are individually unique, have different properties, and are provably scarce.

A member can acquire rights to virtual goods, such as an avatar, from the platform provider or from third parties, e.g., creators or brands, and those rights are verified on compatible blockchains through a programmable token. A member can, for example, directly set the avatar as their profile image on the platform and client application. Other members can easily view the avatar in the client application and go to a store or marketplace to also acquire rights to the avatar, all within their respective instances of the client application. The provider of the platform can sell, giveaway, or facilitate sales or giveaways of avatars that are verified on compatible blockchains through programmable tokens to members, including based on member activity in specific communities or on the platform as a whole.

A decentralized network of communities advantageously need not rely on platforms for governance and hence need not rely on any one platform to maintain their communities (including its membership). In addition, community members need not rely on any one platform to maintain their influence and reputation through community points and representation of their identity and interests through an avatar. Instead, community members may carry both with them across the social-media network.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

I. Community Rules and Governance

Figure 1:
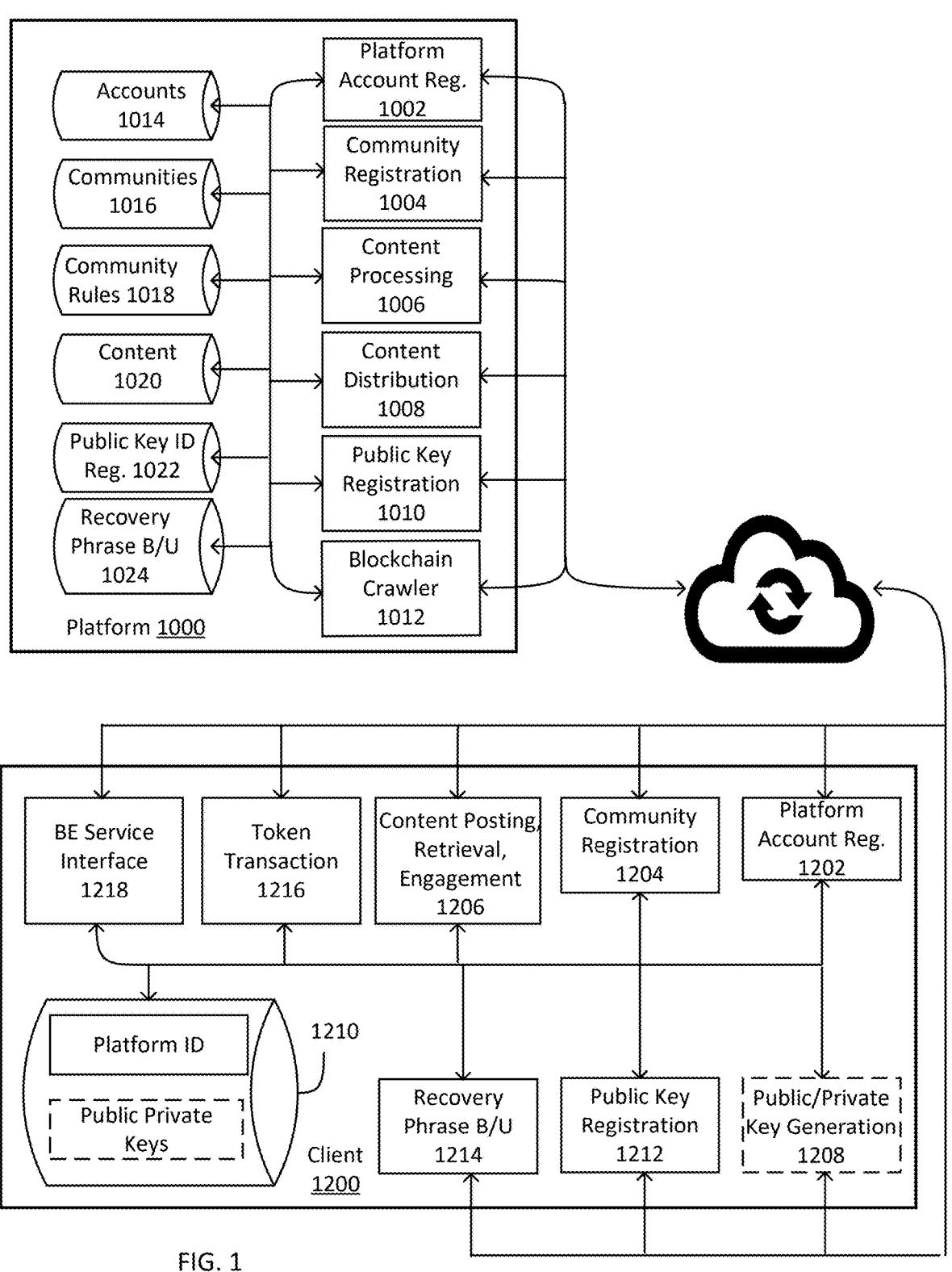
FIG. 1 shows a decentralized social-media network.

Communities of the decentralized social-media platform are diverse in many ways, for example, interests, cultures, and rules can vary broadly across the spectrum. The decentralized platform leverages rich clients, e.g., stand-alone clients which can be executed on mobile or desktop devices, that provide functionalities independent of platform servers to enable each community to be self-empowered. This generally speaking means they are able to pursue autonomously their common interests in ways acceptable to their common values, e.g., define their own membership qualifications and rules of governance and engagement, including those for content creation, posting, re-posting, moderation, and comments, any and all of which, including moderation, are notably user-generated content. Moreover, they can support application development and marketplaces or other economies for community assets. Community-specific rules are defined and administered by each community rather than the platform provider and, hence, can be independent from platform rules, with few exceptions, one being compliance with safety rules that are imposed platform wide. Rules of engagement are in effect implementing bicameral governance in that the platform provider establishes platform rules, which implement minimally acceptable behavior for everyone on the platform, a sort of foundational social contract. The communities each are free to define their own respective set of rules, including those for economies that are exclusive to each community, that adapt and expand the foundational social contract.

Community rules of each of the different communities are enforced programmatically and by respective, designated moderators, the volunteer members of the community who have qualified, for example, because they created the rules or by proving that they have sufficient knowledge of the rules for that community. In terms of information retrieval of community content, both the programmatic platform enforcement and moderators can affect what content is accessible and determined to be relevant to the community. Both the community-specific rules and the moderator actions provide signals of quality and relevance for information retrieval.

Optionally, community rules can be implemented through smart contracts and programmable tokens on compatible blockchains. Community members can define and vote on rules of governance, e.g., what contributions to the community are rewarded, what rights and privileges a member is granted based on measures of their influence and reputation in the community, etc., and can implement those rules through smart contracts on compatible blockchains. Moreover, while the community owns and controls the smart contract on blockchain, the community has the option to delegate a subset of the rules to the platform by including a pointer in its smart contract to another smart contract that is owned and controlled by the platform, namely a beacon contract, which functionally, is a programmatic auto updater. The beacon contract includes a swapable pointer to an implementation contract, which is also owned and controlled by the platform, and which has computing logic defining the subset of rules the community has delegated to the platform. The beacon and implementation contracts are implemented on blockchain. In operation, the platform can update the subset of rules by swapping the pointer in the beacon contract to another implementation contract. The community can revoke its delegation by removing or redirecting the pointer to another beacon contract, e.g., one corresponding to another platform. These capabilities can be used when leaving one platform for another to facilitate rule changes, which enhances community autonomy and independence.

II. Community Member Influence and Reputation

Of particular interest and utility are rules and functionalities relating to a member's reputation and influence in a community, which two constructs are different in many respects. For example, influence is generally more objective in that measures of influence can be computed programmatically based on the reach of a member's content, e.g., impressions, comments, as well as other forms of engagements. On the other hand, measures of reputation are computed based on heuristics and nondeterministic signals. These measures of influence and reputation, including indicia of contribution, can be published on the platform and to the community in reference to the member or the member's content, which enables others of the community to gauge accuracy and trustworthiness, especially community moderators.

By providing these measures along with content associated with the member, other community members and consumers of the content can typically make up their own subjective minds about whether it contributes value to the community and/or how much to trust the content in view of the measures of reputation. Members can evidence their minds thereafter by upvoting or downvoting the content, which informs the reputation and influence of the community member that created such content. These upvotes and downvotes, when tallied for a particular community, provide suitable signals to programmatically determine the community's subjective impression of the content. Community-specific impressions can be combined to determine a more general impression of the member's contribution. Notably, community rules are highly idiosyncratic and, importantly, are not used just for trust and safety, but can further be used to foster culture in a particular community, including practices embraced by that community. A community of fans of the game Fortnite, for example, may have a rule that prohibits spoilers and leaked content. A community of fans of cryptocurrencies can have a rule that requires members to give a fair voice to all crypto projects, avoiding the "one coin above others" mentality.

In one implementation of the measures of influence and reputation, platform heuristics compute a contribution score based on the member's collective and contemporaneous engagement with the community, in a figurative sense their community karma. Contributions accounted for in the computation are not limited to creation and/or posting of content for the community, but rather can include any and all effort that helps the community thrive under community rules, culture, and other social constructs, especially moderation of content and governance. The community-specific rules are applied to compute a final score for the member, based on these contributions. The final score determines the allocation of community points the member earned, which are then distributed to members of the community according to their respective allocations.

Notably, the same contributions can yield a different final score under different rules, e.g., community-specific rules of another community. In conjunction with the periodic distributions of community points, the member can take actions by which community points are increased or diminished, and so between distributions of the community points, a current tally of community points is computed for the member, typically in real-time or near real-time. A cumulative tally of community points over the lifetime of membership in the community can be useful information and so is computed. Any combination of the cumulative community points, current tally of community points, contribution score, and final score can be applied to indicate reputation and programmatically dictate influence. Typically, members join multiple communities and hence have community points for each of their respective communities.

Optionally, community rules and points can be implemented through smart contracts and as programmable tokens on compatible blockchains. Implementing community rules through smart contracts enables community members to receive programmable tokens representing their influence and reputation in the community based on community rules. In general, community points are verified on compatible blockchains by fungible programmable tokens and are implemented to reflect and quantify contribution to a community and/or to the platform, but they can also be verified by non-fungible programmable tokens. In effect, the more one contributes to the community, the greater one's allocation, and the community has the final say in how contributions are measured.

Implementing community points through programmable tokens on compatible blockchains further enhances community autonomy and independence, as rich clients have functionalities to record on blockchain, independently from the platform, transactions involving community points. The member can, for example, use community points on other social-media platforms, which in turn can rely on them as credible representations of influence and reputation and advantageously, for example, avoid problems usually complicit with cold starts, e.g., newly registered members without sufficient engagement history. Any platform of the network, even if they have different, independent providers, can grant rights and privileges upon registration in a well-informed way, not just the platforms with which the member has a history of engagement. The rights and privileges granted include rights to moderate content and membership in closed communities, and can also be differentiated between community points earned by members based on community rules and community points received from other members that may be less likely to credibly reflect such member's influence and reputation in the community. Community points can also be used to identify the respective communities in which the community points are earned. Since communities are associated with one or more interests, e.g., cats, gaming, world news, relationships, etc., community points can provide reliable signals of interest for any platform, regardless of engagement history, which can leverage the community points to select, with acceptable accuracy, content of interest even in cold starts.

Optionally, the programmable tokens associated with community points can be soulbound, which generally means they are tied to their respective owners for life and transfer functionality is frozen. Soulbound community points can further avoid problems complicit with cold starts, as other social-media platforms can rely on them as credible representations of influence and reputation without needing to assess whether community points were received from other members and not earned based on community rules. Here, soulbound community points may be more accurate in reflecting such member's influence and reputation in the community.

As an alternative or in addition to community points, other indicators of contribution can be computed. For example, a measure of contribution based on upvotes and downvotes for posts created by the member, i.e., the member's post karma, can be computed. A post is content published to a community page. Likewise, a measure of contribution based on upvotes and downvotes for comments of the member, i.e., the member's comment karma, can be computed. A comment is user-generated content published in response to a post and references the post. The member's contribution across communities on the platform, i.e., the platform karma or simply karma, is the aggregation of post karma and comments karma across all communities to which the member belongs.

Optionally, the member also has a contributor quality score, which is a measure that indicates the risk of spam or the other usual suspects of unwanted content that plague communities, e.g., hate speech, harassment, and impersonation. The score is computed based on a host of signals, including past platform actions taken on the member's account, network and location signals, and steps the member has taken to secure their account, like email verification and other proof-of-endpoint possession, as well as two-factor authentication, for example. Notably, a measure of influence can be computed based on a first combination of any of community points, contribution score, and contributor quality score. A measure of reputation, or reputation measure, can be computed based on a second combination of any of community points, contribution score, and contributor quality score, where the first combination and the second combination are different.

Incentives may also be provided to members of the community to enhance contribution and thereby improve content of the community. For example, community rules can be altered to allocate more community points to members with higher measures of influence and reputation tied to specific types of content, e.g., posts with high word counts or comments with media, which can enhance idiosyncratic community culture. Alternatively and additionally, virtual goods can be given to community members based on the computed measures of their influence and reputation and/or based on their contributions, or virtual goods can also be distributed by other members of the community or by brands interested in rewarding members of specific communities who are top contributors to their brand. Similar to community points, the type and quantity of virtual goods received by a member can be published on the platform and to the community in reference to the member or the member's content, which enables other members of the community to gauge accuracy and trustworthiness. A virtual good can also be represented by a fungible or non-fungible programmable token. Incentives for members of the community can also include real-world rewards. For example, money can be awarded to qualifying members for qualifying content based on their respective measures of influence and reputation and/or receipt of virtual goods from other members. As used in this specification, the term "ID" means identifier.

As shown in FIG. 1, a system implemented in accordance with aspects of the invention includes a social-media platform, Platform 1000, and a stand-alone client, Client 1200. Platform 1000 is implemented on one or more servers. Instances of Client 1200 are downloadable to and executable on end-user devices, which can be smartphones, laptop computers, desktop computers, tablets, game consoles, wearable devices (e.g., smartwatches, virtual reality, and augmented reality goggles), and Internet of Things (i.e., IoT) devices.

Platform 1000 has multiple computing resources in its technology stack that enable communities on the platform to be self-empowering, including computing resources for Account Registration 1002, which generally registers end users with the platform, Community Registration 1004, which generally registers end users with communities, Content Processing 1006, which generally intakes user-generated content, as well as other content, and processes the content (e.g., classify or otherwise analyze, moderate, etc.), Content Distribution 1008, which generally distributes content on the platform, Public Key Registration 1010, which generally pairs public keys with platform IDs, and Blockchain Crawler 1012, which crawls one or more compatible blockchains to detect and retrieve information of records that reference IDs of end users who have registered the public keys with the platform and, furthermore, that reference programmable tokens used on the platform.

Platform 1000 further has datastores, including those for Platform Accounts 1014, which generally stores account information, including IDs of end users who have accounts with the platform, Communities 1016, which generally stores information about communities, including their respective list of members, Community Rules 1018, which generally stores community-specific rules for each community, Content 1020, which generally stores content, information about the content obtained by heuristics and machine learning, and relationships of content and accounts (optionally represented digitally as a knowledge graph stored in memory on servers), Public Key Registry 1022, which generally stores the public keys of end users along with their respective IDs, and Recovery Phrase Backup 1024, which generally stores encrypted recovery phrases along with their associated recovery password.

Content information includes user-generated content, which can be, e.g., in the form of posts, comments, polls, rules, avatars, live streamed audio and/or video sessions, and associated engagements, which can be impressions, reposts, downvotes and analogs, upvotes and analogs, poll responses, and moderation of content. Content is not limited to texts, but can include images, as well as video and audio content, both of which can be live or recorded. Moderation of content includes blocking content from being posted and removal of content that has already been posted. Notably, user-generated content also includes community rules, which are enforced by community members and not employees of the platform, and which can be changed by community members, optionally by voting and/or polling. Analogs of upvoting include gifting of virtual goods.

Content information can be stored as data objects, each of which can have a unique ID, data, and/or logic. Data objects can reference each other, and their relationships can inherently store information. For example, a post by a first member can include a comment on the post submitted by a second, different member. Another comment was submitted by the second member, but it was blocked by a moderator or removed after submission by the moderator. The data object of the original post references the data object of the first person, and the data object of the comment references the data object of the post and the data object of the second person. The data object of the post can also reference the data object of the comment, e.g., for display purposes when the comment is a most popular comment. The data object of the blocked comment can reference the data of the post and a data object of the moderator. These references represent the sequence of engagement with content and enable the system to chronicle engagements amongst community members. When analyzed together with their data objects, specifically the type of data objects, e.g., post, comment, and moderation, references further enable the system to infer intent and even sentiments of content. Data objects of the system can include programmable tokens stored on compatible blockchains. Suitable data objects are platform agnostic and hence can be ported to different platforms of the network without significant transformation or without requiring significant changes to the platform's infrastructure for compatibility.

Client 1200 is a rich client and, as such, has computing resources that provide functionalities that further enable communities on the platform to be self-empowering. These resources include Platform Account Registration 1202, which generally provides functionalities for an end user to register with the platform by creating a platform account that has associated ID and password, Community Registration 1204, which generally provides functionalities for end users to select and join selected communities, e.g., including verifying any qualifications needed for membership, Content Posting, Retrieval, and Engagement 1206, which generally provides functionalities for end users to create, post, retrieve, and engage with content of their respective communities, Public-Private Key Generation 1208, which generally uses suitable entropy and cryptographic algorithms or asymmetric cryptography to generate blockchain keys and stores them in Secure Storage 1210, which generally is inaccessible to platform servers of the network, Public Key Registration 1212, which generally communicates with Platform 1000's Public Key Registry 1022 to pair the member's ID and public key, Private Key Backup 1214, which communicates with Platform 1000's Recovery Phrase Backup 1024 to recover a lost private key, Token Transaction 1216, which generally provides an interface through which the member can use an external blockchain wallet (e.g., they already have blockchain keys and do not want to have two sets of keys), and Backend Service Caller 1218, which generally runs on Platform 1000 and which Client 1200 can call when a layer of logic on top of the blockchain is useful or needed, e.g., when Platform 1000 pays for gas or royalties or when it checks whether transactions are illicit in nature.

In operation, the resources of Platform 1000 exchange information with appropriate resources of Client 1200 to perform computing tasks. Client 1200 has a user interface (visual, audio, tactile, and a combination of them) to provide information to end users and, furthermore, to receive user input from end users. User interfaces can be implemented with keyboards, game console controllers, touchscreens of smartphones, touchscreens of automobiles, and touchscreens of IoT devices. Platform 1000 and Client 1200 also exchange information, which can include encrypted and signed information, with compatible blockchains and their virtual machines. A suitable blockchain is Ethereum, which includes a virtual machine that serves as a runtime environment for executing smart contracts and other decentralized applications. A scaling and efficiency solution can be utilized or implemented as a second layer or side chain (Layer 2) to the public blockchain (Layer 1). Layer 2 solutions created by third parties can be used for community points and/or avatars. There are also alternatives to Ethereum that have the minimum standards and features needed by Platform 1000 and are hence suitable for use.

Figure 2:
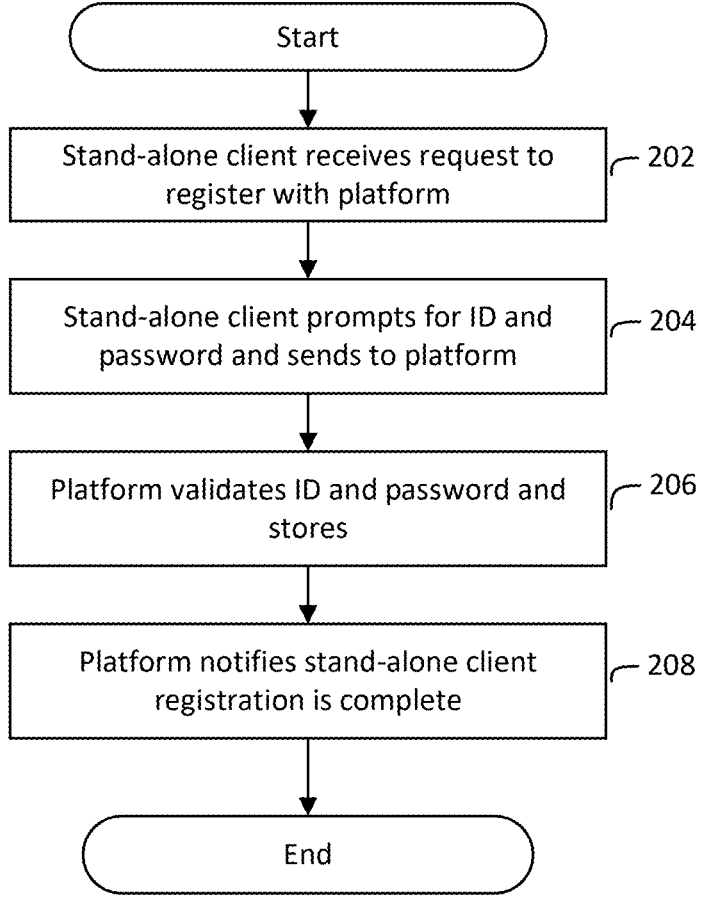
FIG. 2 shows a method to create an account with the platform.

FIG. 2 shows a method for creating an account for Platform 1000. Client 1200 receives a request from an end user, via a user interface of a device on which Client 1200 is running, to register with the platform (step 202). In response, Client 1200 prompts the end user for an identifier and associated password and sends that information to Platform 1000 (step 204). Platform 1000 receives and validates the ID and password (step 206), which includes verifying that the ID is not yet already in use by others on the platform and, furthermore, that the password complies with password requirements. If validation is successful, then Platform 1000 notifies Client 1200 that registration is complete (step 208). Otherwise Platform 1000 sends a request for Client 1200 to re-prompt the end user for another ID or qualifying password. Optionally, one or more avatars described in this specification can be given as part of onboarding a new user to the platform and can precede the user joining any communities. This option can be implemented as a call to action and serve as an incentive for the user to add or create a blockchain account as described below in reference to FIG. 3.

Figure 3:
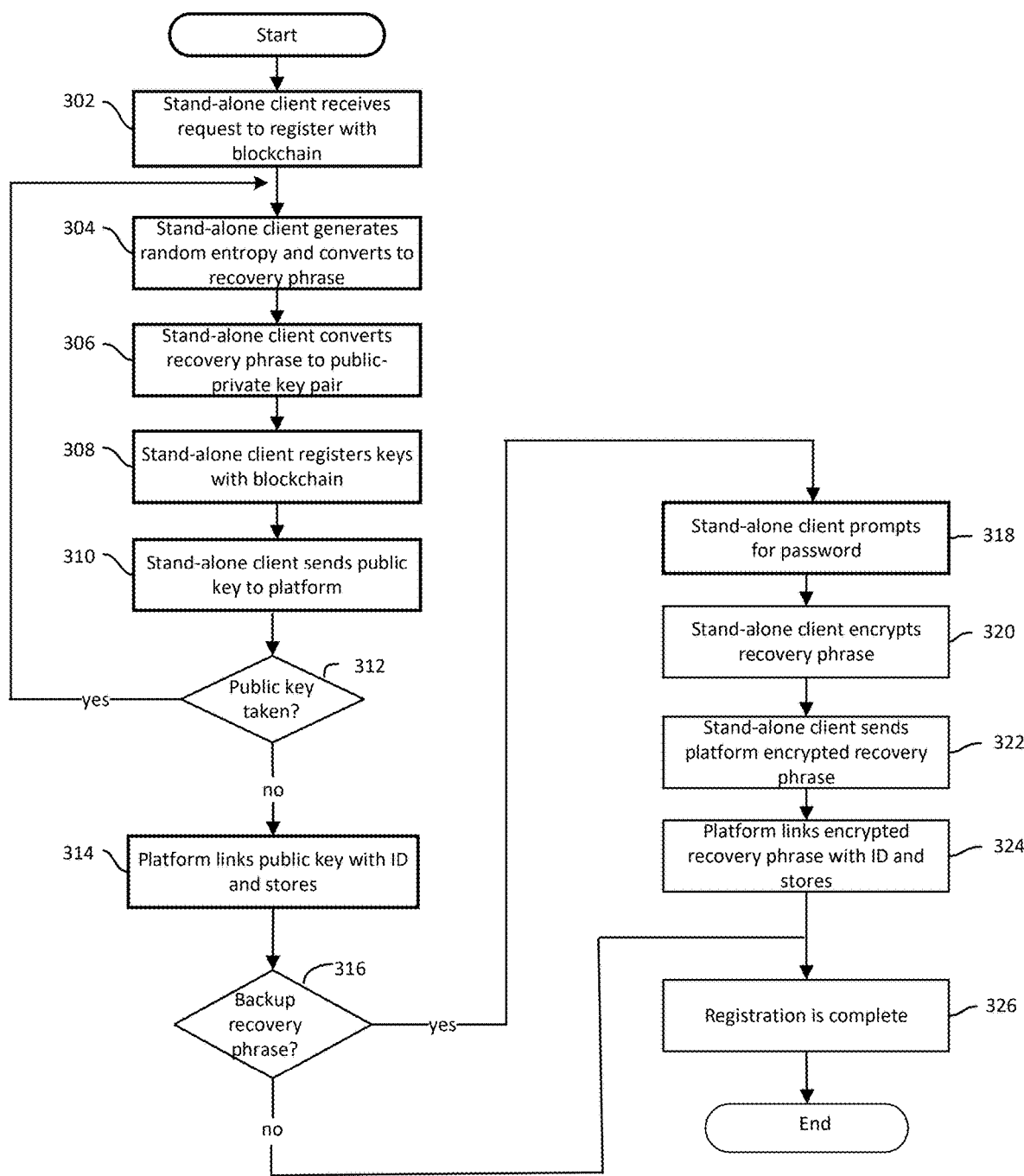
FIG. 3 shows a method to create a blockchain account.

FIG. 3 shows a method for creating a blockchain account. Client 1200 receives a request to create a blockchain account (step 302). In response, Client 1200 generates a piece of random or pseudo-random entropy and converts it to a recovery phrase (step 304). Client 1200 generates a private key and a public key using the recovery phrase (step 306). The generation of the private and public keys is insulated from Platform 1000, which has no access to the private key or the process by which it was generated. Client 1200 optionally communicates with the blockchain (step 308), which can include, for example, sending state information to a virtual machine on or off the blockchain. Client 1200 sends the public key to Platform 1000 (step 310), which checks its Public Key Registry 1022 to see whether the public key is already being used on the platform (decision 312). In the instance that it is indeed being used already, Platform 1000 notifies Client 1200 to repeat step 304. Otherwise, Platform 1000 links the public key with the ID of the end user and stores them in its Public Key Registry 1022 (step 314). For an extra measure of precaution, a backend service of Platform 1000 optionally issues a challenge phrase that must be signed with the member's private key (the one paired with the public key being registered) so Client 1200 can prove to the backend service that it does indeed control the public key (stored in its Secure Storage 1210). In one implementation, the challenge is an EIP-712 message, which is pre-hash and hence can be human readable (easier for members to understand what they are being asked to sign). Once signed, Client 1200 then registers the public key with Platform 1000, passing the signature as proof, and Platform 1000 then verifies the signature and formally links the public key with the member's platform ID. Client 1200 gives the end user an option to backup the recovery phrase (decision 316). If Client 1200 receives a negative response declining the options, then Client 1200 notifies Platform 1000 and the registration process is complete (step 326). Otherwise, Client 1200 prompts the end user for a password, which is a different one than the one used to login to the platform account (step 318). Responsive to receiving the password, Client 1200 encrypts the recovery phrase with the password (step 320), optionally stores the password on a key chain of the end-user device, and sends the encrypted recovery phrase to Platform 1000 (step 322). Client 1200 does not send the unencrypted recovery phrase to Platform 1000, which does not have access to the unencrypted recovery phrase because, e.g., recovery-phrase generation and encryption is performed to the exclusion of Platform 1000 and Secured Storage 1210 is used for storage. Platform 1000 links the encrypted recovery phrase with the ID of the end user and stores the former in its Recovery Phrase Backup 1024 (step 324). If the end user loses the private key and the recovery phrase, then the end user can retrieve the encrypted recovery phrase from Platform 1000 and unencrypt it with the password on the end-user device.

In one implementation, the public-private key generation process and the private key are insulated from the Platform 1000 by precluding, from blockchain-related processes, any of the customary server calls and other server access to the key generation process or private key. This preclusion is accomplished in a way that preserves ease of use and other conveniences for end users while increasing security of the processes performed. For example, when Client 1200 registers the public-private key pair, it would be a lot easier to just have the client send the private key to prove that Client 1200 controls it. Instead, Platform 1000 issues a challenge and has Client 1200 sign and return the challenge, which extra steps remove the need for the server to have access to the private key, which thereby decreases security risk associated with the owner of the private key granting access to the private key to the Platform 1000, or transmitting it temporarily to the Platform 1000 through potentially unsecured channels.

Here is another example of insulating the Platform 1000 to increase security of the processes. Gas cost of blockchain transactions can be borne by Platform 1000 when the end user transfers community points or avatars. Here, Client 1200 sends a partial request for the desired transaction and signs the partial request. Platform 1000 can then use the signed partial request to create and send a corresponding complete request that is signed with Platform keys. Blockchain gas is thus accrued by Platform 100 instead of Client 1200. Note that it would have been easier for Platform 1000 to store the keys and sign on behalf of Client 1200. Instead, Client 1200 signs part of the transaction, and the proxy contract for blockchain transactions is designed to accept that partial signature along with Platform 1000's full signature. Similar server-isolation mechanisms are implemented for a proxied burn call when the end user spends community points. The burn call records the spend on the blockchain so the blockchain reflects the fact that the end user no longer owns the points spent.

Note that for blockchain transactions performed to its exclusion, when Platform 1000 would not have any notice of the transactions, Platform 1000 can optionally have a service that flags blockchain transactions that reference public keys associated with platform IDs. In response to flags from the service, Platform 1000 can search information recently retrieved by its crawler for the flagged platform IDs and refresh the states of its data objects associated with those platform IDs, which updates information on the platform to account for and reflect the blockchain transactions.

Lost private key recovery provides another example of insulating the Platform 1000 to increase security of the processes. In an alternative to the method described in reference to steps 318, 320, and 322 of FIG. 3, the private key is split into three components. A first partial key is stored on a third-party server under their credentials for access to that third-party server. A second partial key is stored on the end user's device, e.g., Client 1200. And a third partial key is stored on servers of Platform 1000. Instead of providing a password, the end user just needs to sign into the third-party server and join that partial key with the partial key on Platform 1000 server to recover the lost private key. Hence, the need for a password for the recovery phrase is eliminated when backing up the private key.

Figure 4:
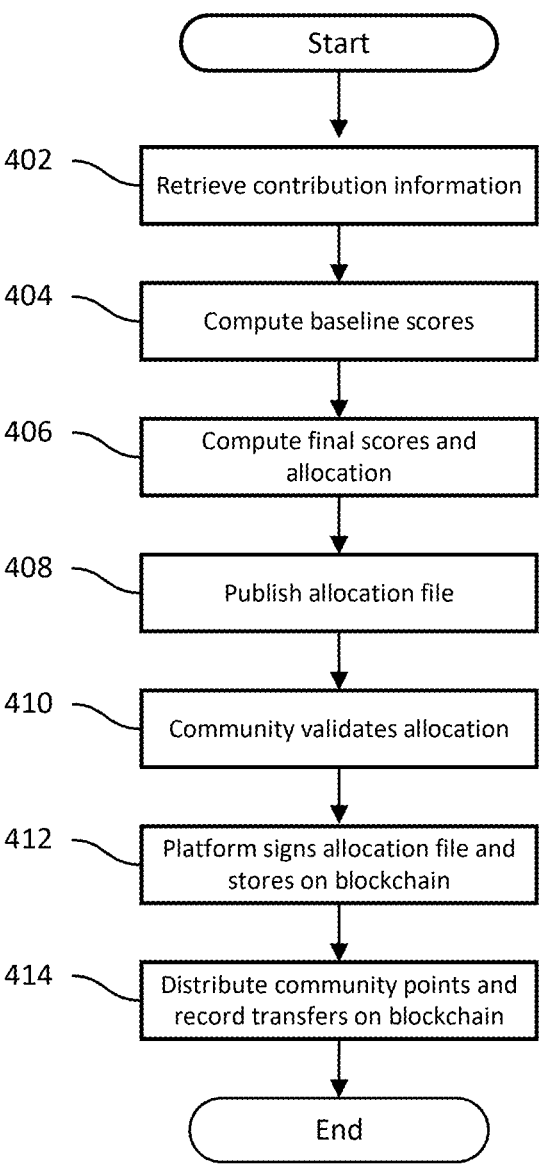
FIG. 4 shows a method to distribute community points.

As shown in FIG. 4, Platform 1000 retrieves contribution information from one or more logs of contributions made by members of a community over a period of time (step 402). Contributions can vary by member, where members can be contributors, moderators, creators, or developers. For example, contributors create, post and repost content, and up or down vote content. In another example, moderators enforce community-specific rules and report and take action against violations of those rules, e.g., taking down content, blocking accounts, verifying content, and correcting content.

Moreover, members can help with governance of the community, e.g., suggest rules and vote in polls to adopt new rules. Examples of rules include those used to compute an allocation of community points being distributed based on how much each member's contribution has enhanced the community in the pursuit of its interests under its values. A member can contribute to the community as a content creator and a content moderator, and the member can also contribute by participating in voting and rulemaking.

Platform 1000 computes a baseline score for each member of the community based on their respective contributions during the period and platform-wide rules (step 404). Optionally, these rules are voted on by members of all communities on the platform.

Platform 1000 applies community-specific rules to compute a final score for each member and computes an allocation of community points being distributed according to the final scores (step 406). The allocation of community points, and optionally the scores computed, are written to a file, which the platform publishes to the community (step 408). The members of the community vote to validate the allocation (step 410). Optionally, the members of the community can leverage the blockchain to implement the vote when there are security concerns. Once the community validates the allocation, Platform 1000 signs the file with its blockchain keys and records it on the blockchain (step 412). Platform 1000 transfers community points to the members of the community and records the transfers on the blockchain (step 414). Because their community points are on the blockchain, members (who have blockchain accounts whose private keys are by design unknown to and inaccessible by Platform 1000) are free to further transfer them without needing approval from Platform 1000, subject to certain limitations for safety.

Figure 5:
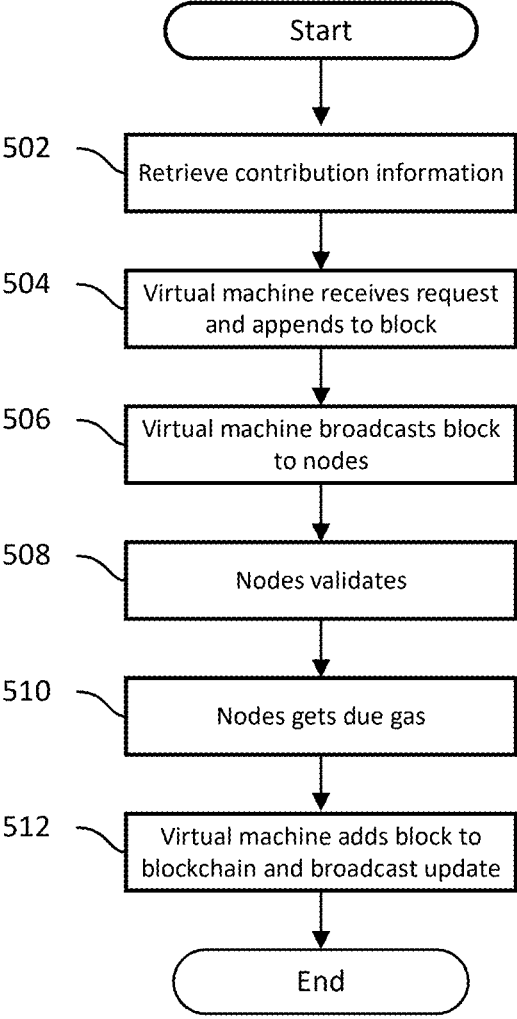
FIG. 5 shows a method to record a transaction on blockchain.

As shown in FIG. 5, a life cycle of a blockchain transaction starts with Client 1200 sending a request signed with the end user's keys (step 502). A virtual machine of the blockchain receives the request and appends it to a block (step 504). The virtual machine can run on Layer 1 or Layer 2 of the blockchain. Typically, a block has multiple requested transactions to validate and record. The virtual machine broadcasts the block to nodes of the blockchain (step 506), each of which then validates the block with a consensus mechanism, e.g., proof of stake or proof of work (step 508). Upon completion, the nodes receive their rewards, commonly known as gas (step 510). Optionally Platform 1000 pays for the gas in its transactions with members to make the process user friendly and more streamlined, which option is especially helpful for blockchain novices. When Platform 1000 does pay for gas, it can check for fraud, sanctions, and other illicit activities. This check can optionally be executed regardless of whether Platform 1000 pays for gas. Details of one implementation of how this is accomplished are discussed with reference to FIG. 6. The life cycle is complete when the virtual machine adds the validated block to the blockchain and broadcasts the update (step 512).

Note that when a member spends community points that are programmable tokens, e.g., to redeem a virtual good, these points can be deleted with the on-blockchain burn transaction described above. The transaction is proxied so Platform 100, rather than the member pays the blockchain gas fees. The on-blockchain burn transaction can be proof to verify that the spent community points have been deleted.

Figure 6:
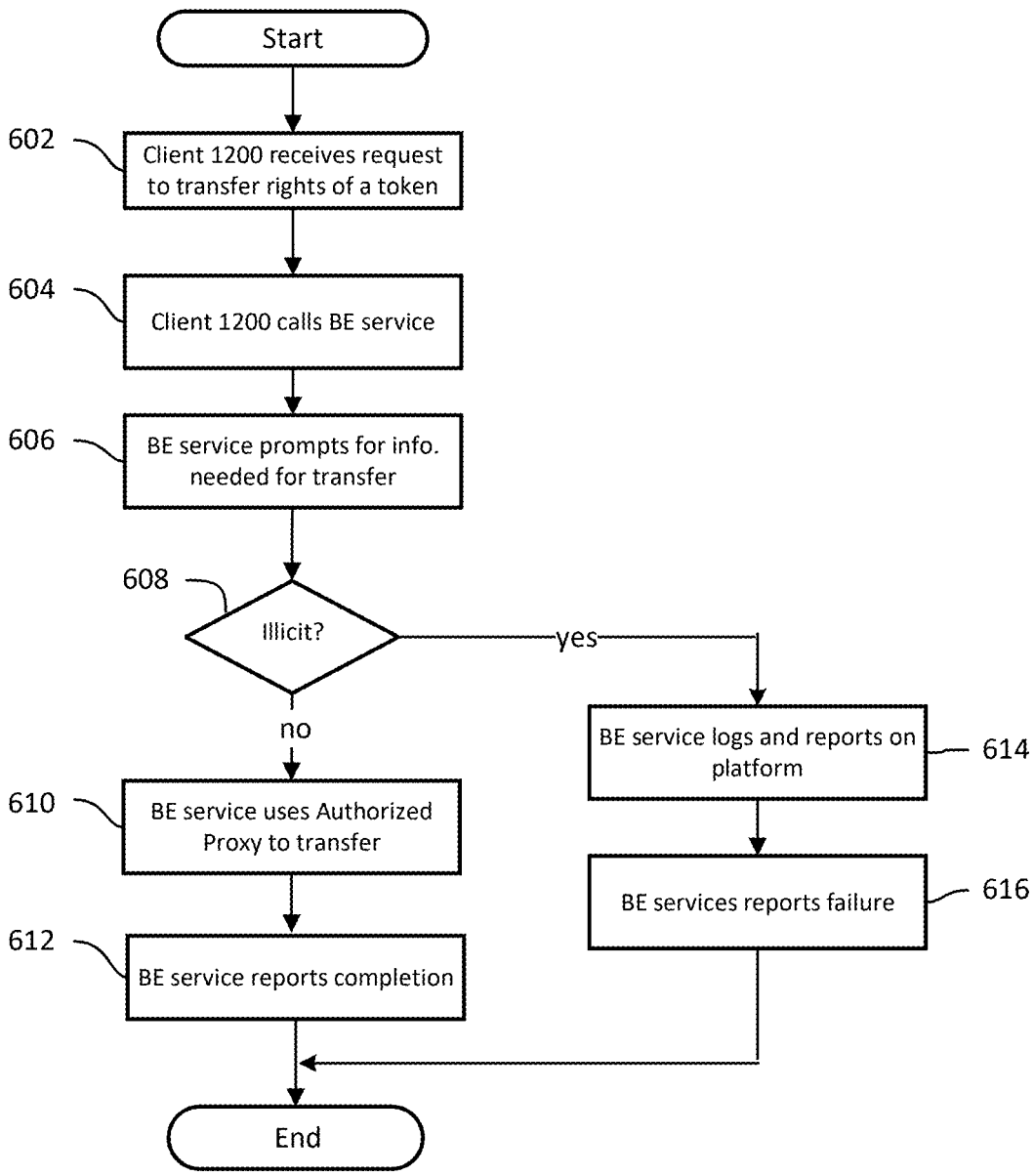
FIG. 6 shows a method to check for illicit transactions.

In one implementation, the mechanism by which Platform 1000 checks for illicit activities is a logic layer on top of the blockchain. Specifically, Platform 1000 employs a smart contract, on the blockchain, that is authorized to transfer programmable tokens on behalf of its rights holder, responsive to the rights holder's prompting, through the user interface of Client 1200, and subject to the rights holder's approval. (Let's call this smart contract "Authorized Proxy.") Off the blockchain, Platform 1000 has a backend ("BE") service that has the private key for operating through that contract. Moreover, it has resources to search available datastores, private and public, that lists known illicit actors, their accomplices, and compromised tokens. FIG. 6 illustrates how the mechanism for checking for illicit activities works in operation.

III. Community Member Identity and Interests

With many communities on the platform, avatars are an important part of community culture. Like the bicameral framework of rules that govern content and behavior, the platform provides a framework in which avatars can be highly and granularly customized by members of the community, especially to enhance community culture. The platform, e.g., Platform 1000, facilitates avatar generation with its avatar builder, which provides options for fundamental appearance and functionality. Appearance specifies what the avatar looks like, and functionality specifies what the avatar does, e.g., animation and sounds, and what a member can do with the avatar, e.g., change components of the avatar and/or use the avatar for authentication of content and for identification. Avatars thus generated can be further customized by members and take on visual identifiers or interest characteristics of their respective members. In some cases, avatars are sufficiently unique to provide a digital fingerprint of the member to which they belong.

While all avatars are blockchain capable, they need not all be blockchain enabled. Blockchain-enabled avatars include programmable tokens, whereas platform avatars do not. As used in this specification, avatars that are not blockchain enabled are called platform avatars, and avatars that are blockchain enabled are called collectible avatars. Both avatars can be stored in a data object such that its appearances and functionalities are preserved off platform, e.g., third-party client applications for social media, third-party clients for gaming, and third-party platforms. This interoperability of avatars across platforms can be facilitated through agreements amongst platforms and/or through programmable tokens.

Both platform and collectible avatars are modular at a highly granular level, e.g., visually and functionally. For example, eye color can be specified, as can the type and style of garments worn. In another example, certain collectible avatars are associated with limited access to communities, content creators (e.g., the creator who designed the avatar art), and so forth. Modules are interchangeable amongst platform and collectible avatars. A member can customize, i.e., mix and match, modules, for example, to achieve an appearance that is thematically appropriate for special events. The member can also customize modules to achieve a functional outcome for their avatar, e.g., to gain restricted access to communities. As used in this specification, avatars that are customized by their members are called customized avatars. Notably, a customized avatar may incorporate components of collectible avatars and platform avatars. In some implementations, customized avatars may also be blockchain enabled and include a programmable token, and be stored in a data object such that its appearances are preserved off platform as well.

Besides building their own customized avatars, a member can acquire platform avatars and/or collectible avatars. Here, the platform, a community, or other third parties can provide a marketplace for avatar acquisition. In such a marketplace, avatars can be acquired, exchanged, and so forth. In cases where a member sells a particular avatar to another member, the selling member loses rights to that avatar, including the right to customize components of that avatar with their remaining avatars, as well as loses rights to whatever functionality the sold avatar provided. Notably, the avatars of a member, as well as the chronicle of transactions relating to avatars, provide information about the member that can be leveraged as signals for relevance and quality.

Optionally, developers of a community can build more options and functionalities for avatars on top of what the platform provides. Alternatively and/or additionally, creators and brands can use the platform's creator portal and avatar builder, along with other enhancements made by the platform and communities, to generate avatars, which can be distributed or sold to community members. Here, avatars are typically designed by creators and/or brands in collaboration with the platform and grant purchasers and/or claimants rights to artwork associated with them, and the platform provides the infrastructure that establishes a distribution channel for the avatars. For example, the NFL can give avatars to eligible members, e.g., those who subscribed to a community having a related subject-matter interest, e.g., r/NFL. For collectible avatars, these giveaways are facilitated by an airdrop, which generally speaking is the sending of programmable tokens associated with a series of collectible avatars to a recipient's blockchain wallet by way of their public key or their platform ID that is linked to their public key. Additionally, members who are fans of the NFL but are otherwise not eligible for the giveaway can purchase NFL avatars from other eligible members who received an NFL avatar, the platform's avatar marketplace, and/or third-party marketplaces. In another implementation, not mutually exclusive with the one above, brands can give brand avatars to members of specific communities who are top contributors to their brand. Qualification to be a top contributor can be computed based on any combination of the measures of influence, reputation, and contribution described in this specification. Members who are not top contributors can purchase brand avatars from other top contributors who received a brand avatar, the platform's avatar marketplace, and/or third-party marketplaces.

Artists and brands may choose to specifically distribute collectible avatars, instead of platform avatars, through the platform-provided distribution channel infrastructure, and members may further elect to specifically acquire rights in collectible avatars. Rights in artwork associated with collectible avatars are typically limited to a strict number of purchasers or claimants, which constraint makes them collectible. Optionally, the rights acquired with collectible avatars can include access rights to an invite-only online event and/or an exclusive community, on or off-platform, sponsored by the respective artist or brand. Notably, collectible avatars include programmable tokens with associated smart contracts, which are typically owned and controlled by creators, the platform, or brands, which may include other platforms. These smart contracts typically define rules governing their programmable tokens, e.g., what rights are conferred to purchasers, and what and how royalties are distributed and collected. As with smart contracts for community-specific rules, those associated with collectible avatars and other blockchain-enabled avatars can optionally include pointers to beacon contracts and implementation contracts owned and controlled by creators and/or brands, by which creators and/or brands may delegate some or all of their rights. A creator and/or brand can delegate, for example, their ability to define rules for royalties to the platform, which can streamline and facilitate the purchase process for both creator and/or brand, on the one hand, and purchaser, on the other hand, by taking care of royalty processing, which is especially helpful for those unfamiliar with blockchain transactions.

As shown in FIG. 6, Client 1200 receives, via its user interface, a request from a community member to transfer a programmable token, e.g., an avatar (step 602). Client 1200 calls the BE service of Platform 1000 (step 604), which prompts for and receives information needed to conduct the requested transfer, e.g., the token ID of the avatar, the community member's platform ID, and the recipient blockchain address (step 606). Note that the BE service need not prompt the community member (through Client 1200) for their public key because it has the member's platform ID and can use that to lookup the public key from Public Key ID Registry 1022. The BE service checks whether the avatar is on the compromised token list or whether the originator (i.e., the community member) or recipient blockchain addresses are on sanctions lists, e.g., the sanctions database of the U.S. Dep. of Treasury (decision 608). The BE service can check other available and trustworthy datastores. If the BE service finds no results in its search, i.e., no illicit activity was detected, then it uses Authorized Proxy-which private key the BE service has—to transfer the avatar on blockchain as requested by the community member (step 610). The BE service reports to the community member via the user interface of Client 1200 that the transfer is complete (step 612). If the BE service detects illicit activities, then it reports and logs the attempt on platform (step 614) and notifies the community member, through Client 1200 and its user interface, that the requested transfer cannot be completed (step 616). Note that this entire process is executed without the Platform 1000 having access to the community member's private key; it is stored locally on Client 1200 and never exposed to Platform 1000. The avatar must also be blockchain enabled and include a programmable token.

In one implementation, the avatar is an amalgam of programmable tokens, which can be associated with avatar skins, tools, gear, other avatar artwork, and avatar functionality. Each programmable token is associated with a two- or three-dimensional object, e.g., FBX, 3DS PLY, OBJ, STL, and Blender objects, generated by a rendering model standardized for the network. Blender provides one suitable rendering model, and Blender compatible objects are suitable for use in rendered digital spaces of the network, including rendered spaces of online games and virtual reality. Each programmable token has a smart contract, which dictates what legal rights come with the object and also any applicable restrictions on use of the object, e.g., to ensure brand safety, proper use of logos, branding, and trademarks. Moreover, the smart contract includes metadata and/or computing logic that dictates how the object functions and interacts with other objects, e.g., an object that represents a Lightsaber can produce a beam of certain colors, but not other colors, it can be held in hand in various ways one can hold a sword, and be activated or deactivated, and an object that represents a baseball cap can be worn on the head in a conventional way or backwards. Optionally, the smart contract can include pointers to alternative rendering models to transform the object so that it can be used in rendered spaces that are not compatible with the standard rendering model, thereby facilitating portability off platform.

In some implementations, the smart contract includes pointers to alternative rendering models to transform the avatar including one or more objects to a static representation of the artwork associated with the avatar for use in other platforms. For example, an owner of the avatar may be required to return to the platform to make changes to the objects of the avatar.

Rights to avatars are not necessarily limited to its appearances, sounds, animation, and related functionalities, but can also be applicable to other functionalities of avatars. For example, responsive to user selection, the system generates a programmable token that specifies that the member has rights to certain avatar functionalities. The functionalities include the capability to use the programmable token to authenticate postings of content made by the member, which authentication can be indicated visually on the post. One way to implement content authentication is to sign the content with the member's private key and then send the signed content to a virtual machine of the blockchain for execution and recording as a transaction block on the blockchain. Then, the system retrieves the signed content when it crawls the blockchain and distributes it to the appropriate community of the platform. Another example of functionality is authentication, which can provide an extra layer of authentication of the member's identity on the platform, thereby enhancing security. Here, the system can, for example, generate a verifiable credential for the member and record information about the verifiable credential on a public blockchain. For example, the authentication can be used to grant the member access to a restricted community, for which an additional token is required for access. Note that rights and subsets of rights to avatars are transferable, subject to constraints specified by applicable rules associated with the avatar, e.g., as defined by the creator of the collectible avatar. So, verifiable credentials would be updated or otherwise changed as appropriate, for example, when transfers occur.

In one implementation, Client 1200 can be used to sign-in with third-party applications and sites. For example, a member's avatar can include a verifiable credential for the member on the blockchain, which can be used to sign-in with third-party applications and sites. A standard API for third-party sites and applications is leveraged in this implementation. This API allows the third-party applications and sites to prompt the member to cryptographically sign messages and transactions with their blockchain private key, which never leaves the Secure Storage 1210 of Client 1200 and hence remains secure. In effect, Client 1200 can be used to sign messages and transactions when requested by the third-party application, just as a conventional wallet would be used, except that Client 1200 provides extra security features. Specifically, Client 1200 optionally—and with member approval-communicates with the third-party application through Platform 1000, which monitors the ferried messages and alerts for risky behavior, including vetting the third party against safe and deny lists. Moreover, the API enforces transactions to be human readable where possible so what exactly is being done is crystal clear to members.

Optionally and similarly to community points, a block-chain-enabled avatar's programmable token can also be soulbound. Soulbound avatars are especially effective when the avatar is used for authentication of identity amongst platforms. Alternatively and additionally, soulbound programmable tokens can be leveraged to send cease and desist letters to members who violate platform trust and safety rules, which can benefit other platforms in the network. For example, platforms sending soulbound cease and desist letters via programmable tokens can publish a list of token-IDs associated with their letters, along with information relating to why their letters were sent to members. Other platforms can choose to use this published information to identify community members who have received cease and desist letters and hence may be more likely to engage in fraud, be subject to sanctions, or otherwise engage in other illicit activities, which further mitigates problems customary to cold starts, e.g., when there is insufficient information about a new member.

Figure 7:
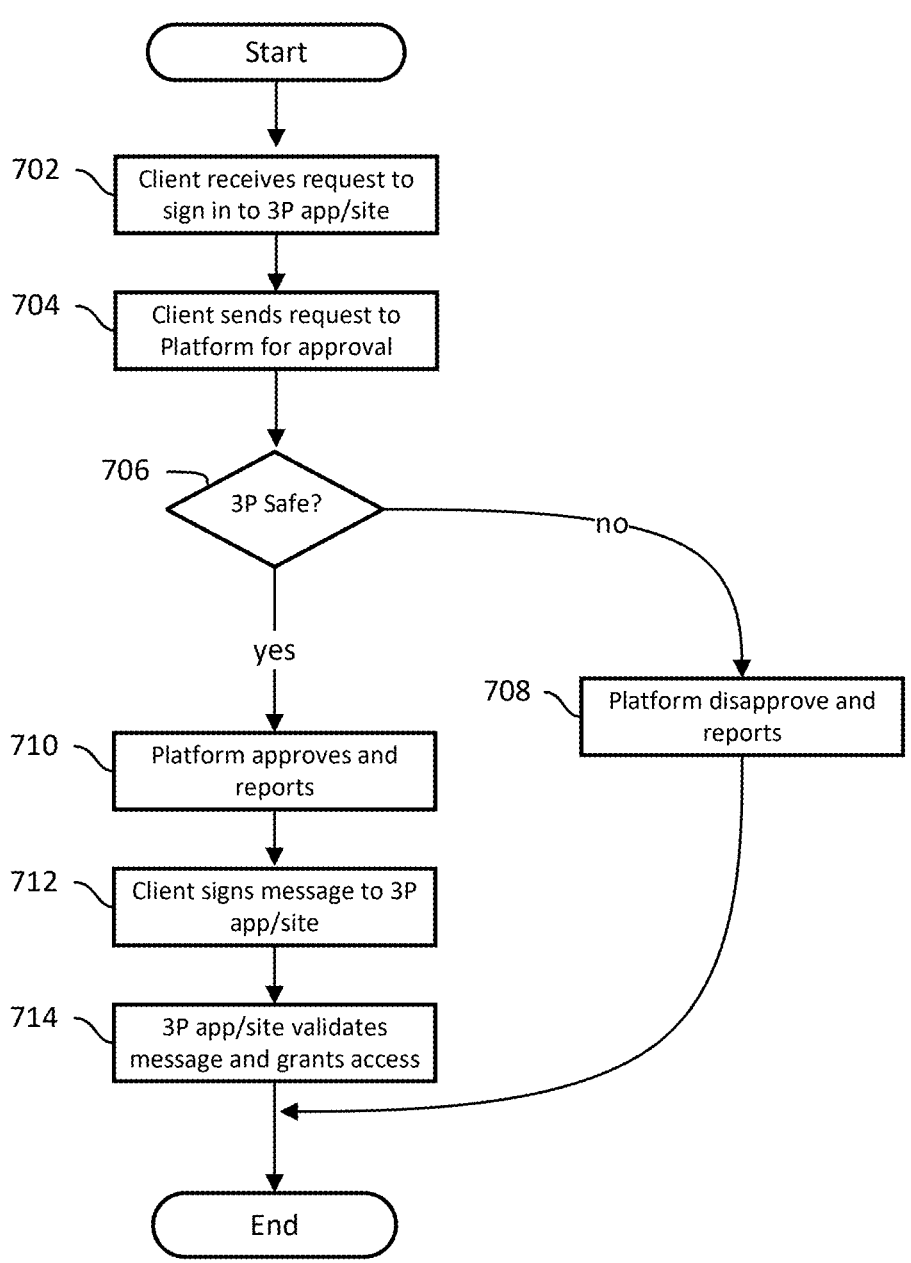
FIG. 7 shows a method to sign-in to third-party applications and sites with blockchain keys.

As shown in FIG. 7, Client 1200 receives a request from the member via the user interface to sign-in to a third-party application (step 702). Client 1200 sends the requests to Platform 1000 along with information about the third party (step 704). Platform 1000 receives the requests and vets the third-party application against its safe and deny lists (which may include lists associated with cease and desist letters) (decision 706). If the third-party application is determined to be too risky, then Platform 1000 denies sign-in and reports to Client 1200 (step 708). Otherwise, Platform 1000 approves and reports to Client 1200 (step 710), in which case Client 1200 signs a message with the private keys stored in its Secured Storage 1210 and sends it to the third-party application via Platform 1000 (step 712). The third-party application checks and determines that the message is valid and grants access (step 714), and Client 1200 can now be used as a token wallet in the third-party application.

There are many compelling and interesting use-cases here. For example, the member acquires rights to a collect-ible avatar, and the rights include a perk to join a premium community off-platform sponsored by the artist who created the collectible avatar. Access is gained by proving that the member has the acquired rights, which the member can do by signing in with blockchain keys linked to the collectible avatar and stored in Secured Storage 1210 of Client 1200, which enables the member to leverage the blockchain to prove that they have the acquired rights. In another example, the member is on an off-platform marketplace that does not offer its own token wallet, but rather requires participants to use third-party wallets. The member can still make transfers on the marketplace by signing in as described in FIG. 7, in which case Client 1200 can function as the member's third-party wallet.

Client 1200 can be leveraged to maintain data coherency between a member's actions on and off the Platform 1000, for example, with respect to the member's programmable tokens. A member may elect to engage with an off-platform site, e.g., an off-platform community or exchange, which results in a modification of the member's blockchain-en-abled avatar or other programmable tokens owned by the member and linked to the member's verifiable credentials. In instances where the Platform 1000 does not have access or has restricted access to the member's actions off-platform, the Platform 1000 can still update the member's platform ID by crawling the blockchain using the member's public key linked to the member's programmable tokens, and updating the Platform 1000 to reflect a current status of the member's programmable tokens. For example, a member may elect to use a third-party marketplace to sell a collectible avatar that they have linked to their verifiable credentials, such that they no longer have access to or rights to use the collectible avatar. The Platform 1000 can crawl the blockchain to determine and update the status of the member's programmable tokens. Continuing the previous example, the Platform 1000 can determine from crawling the blockchain that the member no longer has rights to the collectible avatar and can remove the collectible avatar from representing the member in the platform, e.g., visual representation and/or functionalities granted by the sold collectible avatar.

More generally, the sign-in method enables a cornucopia of benefits because it can be used to prove ownership of a programmable token on blockchain. Benefits can include, for example, access to exclusive live events online and in real life, the use of avatars in virtual realities and rendered spaces of games (on- or off-line), which can be played from gaming consoles, and the ability to sell blockchain-enabled avatars and other virtual goods in secondary markets.

In one implementation, the member elects to use a veri-fiable credential in the network and has the verifiable credential linked to their platform ID (and public key) and stored on the blockchain. Optionally, the verifiable creden-tial is linked to the blockchain-enabled avatar that represents the member. Verifiable credentials are a digital, crypto-graphically secured version of both paper and digital cre-dentials that people can present to organizations that need them for verification. Verifiable Credentials Data Model 1.0 sets a standard established by World Wide Web Consortium (W3C) for verifiable credentials. The main parties involved in the use of verifiable credentials are the issuer, holder, and verifier. The issuer has authority to issue the applicable credentials, e.g., a government. The holder owns the cre-dential and holds it in their digital wallet. The verifier validates or authenticates the credentials, e.g., a service that checks the credentials.

Figure 8:
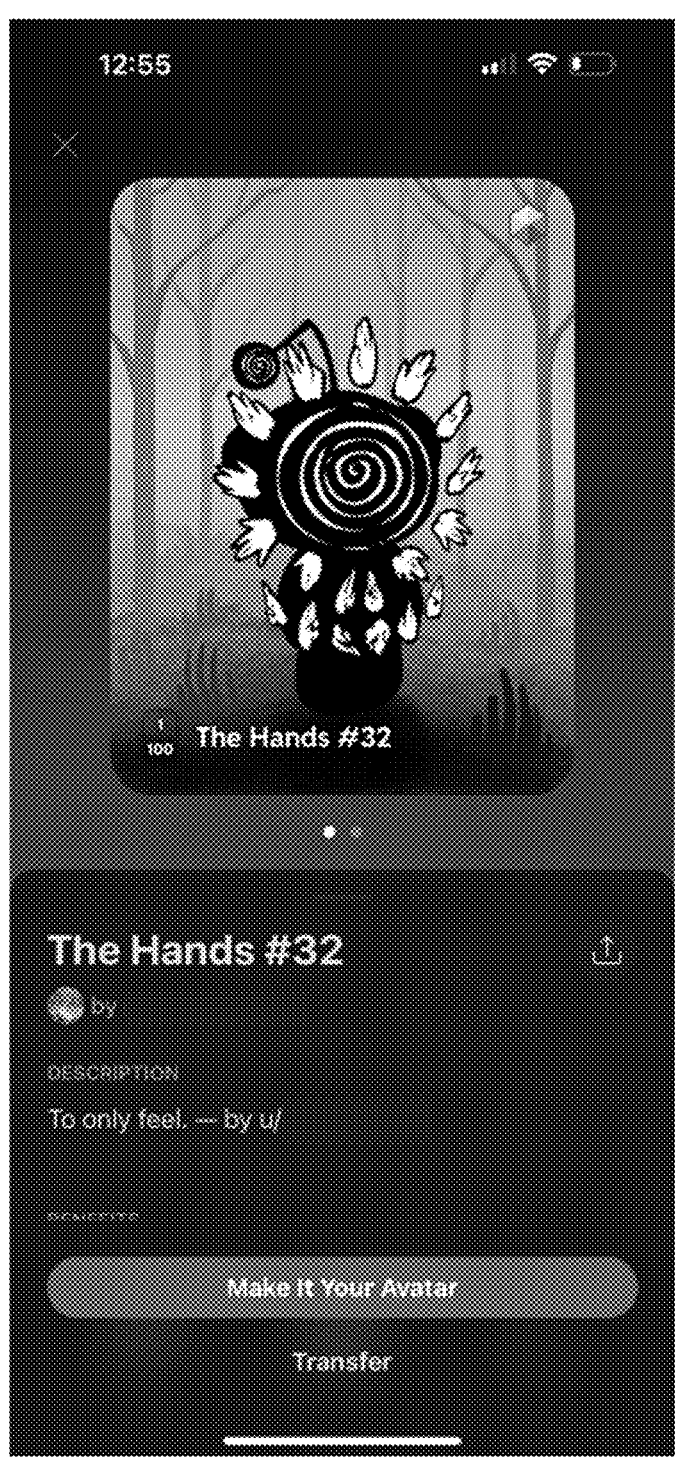
FIG. 8 shows an example of a collectible avatar.
Figure 9:
FIG. 9 shows an example platform profile with a collectible avatar.

FIGS. 8 and 9 respectively show an example avatar and an example member account that includes a depiction of the avatar.

IV. Rewarding Community Member Contributions

Figure 10:
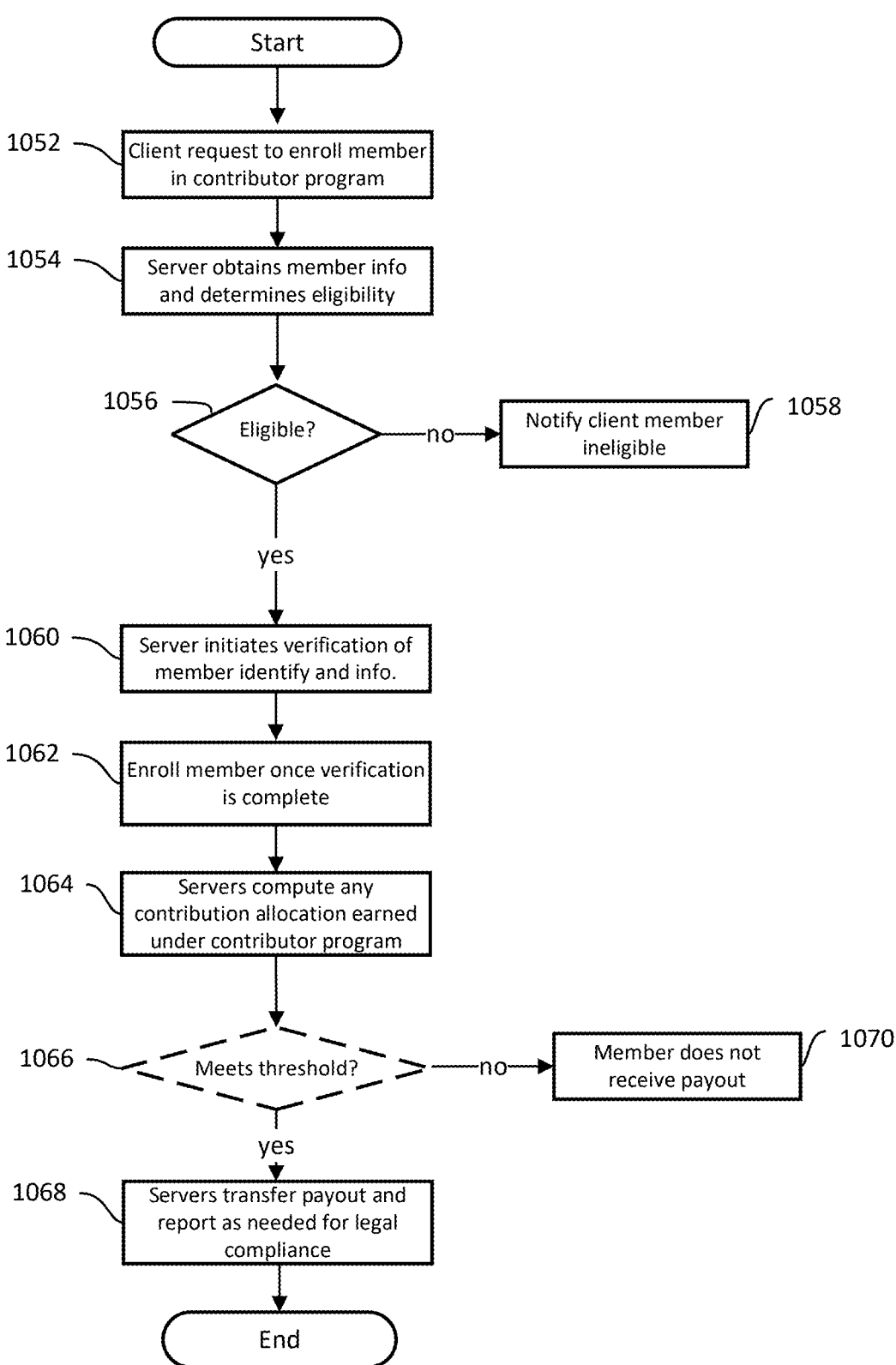
FIG. 10 shows a method for implementing a contributor program.

As described in this specification, incentives may be provided to members of the community to enhance contri-bution and thereby improve content of the community. FIG. 10 shows a method for implementing a program that rewards contributions valued by a particular community on the platform. Rewarding contributions by a member by other members of the particular community can encourage increased member engagement, improved adherence to community-specific rules including community norms and standards, and increased quality of member posts and com-ments in the particular community. A member logs into their account and submits a request to the platform servers to enroll in the contributor program (step 1052). The request includes the member's account information, including the member's ID. In response, the servers retrieve and/or request needed information about the member (step 1054) and determine eligibility (decision step 1056). Eligibility is based on any one of the member's age, residency, whether the account is in good standing, and whether the member has agreed to the applicable terms, conditions, and policies for the program. If not eligible, then the servers return notice that the member is ineligible (step 1058). Otherwise, the servers initiate a verification process (step 1060), which includes getting an email address of the member and then proving that the member has possession of that address, for example, by sending a one-time password to that address. Optionally, other network endpoints can be used, as long as proof of possession can be completed for these alternatives. The verification process also includes receiving and checking the member's personal information, for example, legal name, date of birth, country of residence, and optionally government ID, the last being required only for high earners who may exceed thresholds that trigger compliance with legal and/or industry requirements. Additionally, the verification process includes receiving and checking the member's banking information, which can be done by a third-party payment processor that the member already uses. Banking information typically includes tax information and bank routing and account information. The servers process and store information in strict compliance with applicable laws and regulations.

On successful completion of verification, the member is enrolled in the contributor program (step 1062). The member's account is updated to reflect the enrollment, including enabling GUI functionalities, e.g., those needed so that other members can give the enrolled member one or more virtual goods, e.g., awards and/or gold. Examples of these functionalities are described in reference to FIG. 11.

At the end of a period, e.g., one year, the servers compute any contribution allocation, e.g., payout, award, etc., the member may have earned under the contributor program (step 1064). The payout is computed based on (i) the tally of upvotes and downvotes for qualifying content, specifically the member's post karma and comment karma, and (ii) the total amount of virtual goods that the member has been given by other community members as recognition of the member's valuable contribution to content on the community. To qualify, content must be eligible based on platform content and monetization rules, e.g., be free of not-safe-for-work content. There can be a threshold (decision step 1066) where a minimum of karma and or virtual goods received is needed in order to merit a payout. If there is a payout, then the servers transfer cash in accordance with the member's applicable bank information and report as needed for legal compliance (step 1068). In instances in which a member does not meet the threshold of minimum karma or virtual goods received that is needed in order to merit a payout, the member does not receive a payout (step 1070). Optionally, the payout can be something other than cash.

A user can be eligible for payout under the contributor program for each of the communities for which the user is a member that also is a participant in the contributor program. In other words, the user can receive respective payouts from one or more of the communities for which they are a member, based on respective computations of (i) the tally of upvotes and downvotes for qualifying content in the respective community, specifically the member's post karma and comment karma, and (ii) the total amount of virtual goods received by the user in the respective community. A user may receive different amounts of payout for each of their respective communities.

Figure 11:
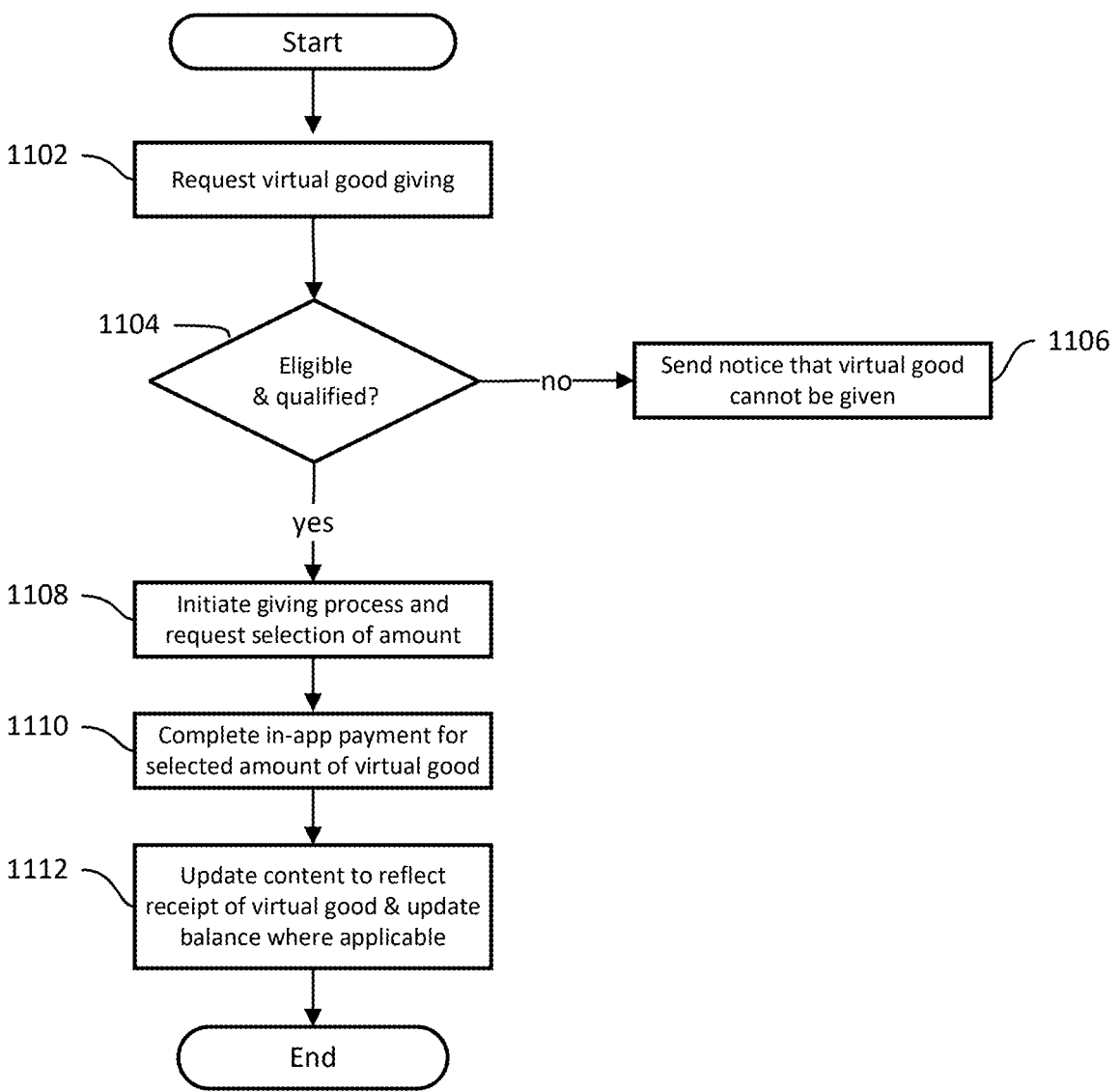
FIG. 11 shows a method for acknowledging valued content by giving one or more virtual goods.

FIG. 11 shows a method of giving virtual goods to another member in response to the other member's qualifying content. A member reading a post or a comment, i.e., a consumer of content, taps and holds an upvote icon on the GUI to request virtual good giving (step 1102). In response, the servers of the platform, e.g., Platform 1000, can check whether the member who created the post or comment, i.e., the content creator, is eligible to receive a virtual good and/or whether the content qualifies for virtual good giving (decision step 1104). If not, the servers return a notice that virtual good cannot be given (step 1106). Otherwise, the servers initiate the virtual good giving process and ask for the type and/or amount of virtual goods the consumer would like to give (step 1108). Notably, there is a top limit to the amount of virtual goods that can be given, which if exceeded, will cause the servers to notify the member and ask the member to select a lower amount. Once the servers receive an appropriate selection of the type and amount of virtual goods, the servers call a payment processing endpoint so the consumer can complete in-platform purchase of selected virtual goods (step 1110). The payment processing endpoint can be one that belongs to a third-party service to which the consumer has already enrolled. Once the in-platform payment is completed, the servers log the transaction and update the post or comment to reflect that it has received virtual goods (step 1112), e.g., by reducing the balance of the virtual goods. Optionally, the transaction can be recorded on the blockchain.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with an end user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well, for example, feedback provided to the user can be any form of sensory feedback, e.g., visual feedback, auditory feedback, or tactile feedback; and input from the user can be received in any form, including acoustic, speech, or tactile input. Additionally, a computer can interact with a user by sending documents to and receiving documents from a device that is used by the user, for example, by sending web pages to a web browser on a user's device in response to requests received from the web browser, or by interacting with an app running on a user device, e.g., a stand-alone client that can be a smartphone or electronic tablet. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship with each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

What is claimed is:

1. A system for implementing a decentralized social-media network, the system comprising:

one or more platform servers of a social-media platform and a stand-alone client, instances of which are downloadable to and executable on devices of end users to interface with the one or more platform servers, wherein the one or more platform servers have computer-executable instructions stored on tangible media to:

in response to a request to register an end user with the platform, wherein the request is received from an instance of the stand-alone client executing on a device of an end user, assign an identifier unique to the end user and communicate with the stand-alone client instance to validate a password and store the password in a user data object that is referenced by the identifier;

in response to a request by the end user to join a community of a plurality of communities of the network, wherein the request is received from the stand-alone client instance, add the end user's assigned identifier to a stored list of members of the community and include a reference to the community in the user data object;

receive, from the stand-alone client instance, engagements of the user with the community and store the engagements as engagement data objects, wherein engagements include one or more of posting content, commenting on content, upvoting content, downvoting content, moderating content, polling, responding to polls, contributing to rules for the community, moderating live sessions, and hosting live sessions, and wherein each of the engagement data objects include its own unique identifier and a reference to the end user's identifier;

in response to a notification from the stand-alone client instance that the end user has a public key for a blockchain, store the public key in the user data object, thereby linking the end user's identifier and public key in the system;

compute a reputation measure of the end user based on the engagement data objects and store the reputation measure in the data object for the user; and crawl the blockchain to retrieve information from records that are associated with the end user's public key, including records that include information about the end user's reputation measure; and wherein the stand-alone client has computer-executable instructions stored on tangible media to:

in response to receiving a request to register with the platform, wherein the request is received from the end user via a user interface of the stand-alone client and includes the password, communicate with the servers of the platform to validate and store the password, receive an indication the password is valid from the servers, and provide an indication that registration is complete to the end user via the user interface;

in response to receiving an election to join a community on the platform, wherein the election is received from the end user via the user interface, communicate with the servers about the election, receive information about the community from the servers, and provide the information to the end user via the user interface;

communicate with the servers to implement engagements by the end user with the community;

in response to a request to create an account on the blockchain, wherein the request is from the end user and received via the user interface, (i) generate a public-private key pair for the blockchain account and (ii) transmit a public key of the pair and the end user's identifier to the servers, wherein instructions to generate a private key of the pair are executed on an end user device to the exclusion of the servers, whereby the servers do not have access to the private key or processes by which it is generated;

retrieve the reputation measure of the end user from the server and record the reputation measure on the blockchain, wherein a record of the reputation measure is accessible to another social-media platform, which has access to the user's public key, whereby the reputation measure of the user is portable to the other social-media platform, and whereby data coherency and data fidelity of the reputation measure are preserved;

obtaining, from the social media platform and using the end user reputation measure, a verifiable credential for the end user recorded on the public blockchain; and using, by the stand-alone client, the verifiable credential to obtain authenticated access to a restricted community.

2. The system of claim 1, wherein the one or more platform servers further comprises computer-executable instructions to perform a distribution of community points to the end user, wherein instructions to distribute the community points includes:

computing, at a point in time, a contribution measure based on the engagement data objects, wherein moderation of content for the community in accordance with community-specific rules enhances the contribution measure;

computing, at the point in time, the end user's allocation of the community points being distributed to the community, wherein the end user's allocation for the distribution of community points is computed based on the contribution measure for the end user at the point in time;

distributing the computed allocation of community points to the end user and recording the distribution on the blockchain, wherein a record of distribution on the blockchain specifies an amount of community points the end user gained and the end user's public key, whereby the record is accessible to the other social-media platform; and crawl the blockchain to retrieve information from records that are associated with the end user's public key and, furthermore, by which community points are transferred, and compute a current tally of community points for the end user based on the information retrieved.

3. The system of claim 1, wherein the engagement data objects include references to each other, whereby the references represent a chronicle of the end user's engagements.

4. The system of claim 3, wherein:

the end user is a first end user;

the first end user's engagements include one of commenting, upvoting, downvoting, reposting, and moderating a post of a second end user on the platform, wherein the post of the second end user is stored as an engagement data object of the second end user; and the engagement data objects of the first end user include references to the engagement data object of the second end user, whereby the references further represent a chronicle of the first and second end users' engagements.

5. The system of claim 4, wherein:

the stand-alone client further comprises computer-executable instructions to record on the blockchain the data objects of the first end user in response to a request from the first end user; or the server further comprises computer-executable instructions to record on the blockchain the data objects of the first end user.

6. The system of claim 2, wherein computing the contribution measure of the end user includes:

computing a karma score for the end user based on the engagements of the end user, wherein the karma score is a baseline score applicable platform-wide; and computing a contribution score for the end user by applying rules specific to the community to change the karma score.

7. The system of claim 6, wherein the rules are stored in a smart contract on the blockchain.

8. The system of claim 1, wherein the reputation measure is based on upvotes and downvotes received for posts and comments of the end user on the platform.

9. The system of claim 2, wherein the servers further comprise computer-executable instructions stored on tangible media to:

publish, to the community, a distribution file that includes the computed contribution score and allocation of community points for the community to validate; and responsive to the community validation, sign the distribution file and record it on the blockchain.

10. The system of claim 9, wherein the servers further comprise computer-executable instructions stored on tangible media to:

compute measures of contribution and allocations for other members in the community; and include in the distribution file the computed measures of contribution and allocations for other members.

11. The system of claim 2, wherein the stand-alone client instance further comprises computer-executable instructions stored on tangible media to:

responsive to a user election to transfer a portion of the community points owned by the user, communicate with a virtual machine of the blockchain to execute and record the transfer on the blockchain.

12. The system of claim 1, wherein the one or more servers further comprise computer-executable instructions stored on tangible media to:

responsive to a selection of an avatar by the end user, generate a programmable token from a smart contract associated with the avatar that represents the end user's rights to the avatar, wherein the end user's rights are one or more rights that are associated with the avatar; and communicate with a virtual machine of the blockchain to transfer the end user's rights by transferring the generated programmable token corresponding to the avatar that represents such rights to the end user's blockchain account and record the transfer on the blockchain.

13. The system of claim 12, wherein the avatar includes features, and wherein instructions to generate the avatar includes instructions to:

responsive to user input, select one or more of the features and define their respective appearances and functionalities, as constrained by the end user's rights to the avatar defined by the smart contract corresponding to the avatar.

14. The system of claim 13, wherein:

functionalities include authentication of postings of content to the community;

an authenticated posting verifies that the content at issue was posted by the end user;

the stand-alone client instance further comprising computer-executable instructions stored on tangible media to:

sign content to be posted by the end user with the end user's private key; and send the signed content to the virtual machine of the blockchain for execution and recording as a transaction block on the blockchain; and the one or more platform servers further comprising computer-executable instructions stored on tangible media to:

retrieve the signed content when it crawls the blockchain;

distribute the signed content on the platform; and log the distribution as engagement for community point computation.

15. The system of claim 13, wherein functionalities include an additional authentication functionality of the end user's identity on the platform, and wherein the one or more servers further comprise computer-executable instructions stored on tangible media to:

generate, from the additional authentication functionality of the avatar, a verifiable credential for the end user and record information about the verifiable credential on the blockchain.

16. The system of claim 12, wherein the stand-alone client further comprises computer-executable instructions stored on tangible media to:

responsive to a request received via the user interface to transfer the rights the end user has to the avatar to another user, communicate with the virtual machine to transfer the rights by transferring the programmable token representing such rights and record the transfer on the blockchain.

17. The system of claim 16, wherein the transfer of rights is performed to the exclusion of the one or more servers of the platform, and wherein the one or more servers further comprise computer-executable instructions stored on tangible media to:

detect the transfer of rights from records that are retrieved by crawling the blockchain and that are referenced by the end user's public key;

update datastores of the platform to reflect the transfer of rights, thereby preserving data coherency for the avatar; and remove uses of the avatar by the end user on the platform in accordance with the transfer of rights.

18. The system of claim 12, wherein the avatar includes a rendering-model object, and wherein the one or more servers further comprise computer-executable instructions stored on tangible media to:

responsive to a selection by the end user of one or more other rendering-model objects that digitally implement avatar artwork, generate one or more respective programmable tokens for the selected rendering-model objects, wherein the generated programmable tokens specify rights for their respective rendering-model objects;

transfer the rights for the selected rendering-model objects to the end user through the generated programmable tokens and record the transfer on the blockchain; and render the avatar in combination with the avatar artwork to which the end user has rights in accordance with those rights, wherein a rendering engine uses the rendering-model objects to render.

19. The system of claim 2, wherein the one or more servers further comprise computer-executable instructions stored on tangible media to:

calculate, by crawling (i) the blockchain, (ii) platform data of the platform, or (iii) a combination thereof, a cumulative amount of community points earned by the end user over a lifetime of engagements with the community; and send the cumulative amount of community points calculated to the stand-alone client instance for display.

20. The system of claim 19, wherein the stand-alone client further comprise computer-executable instructions stored on tangible media to:

receive and display on the user interface the cumulative amount of community points calculated along with the current tally of community points.

21. The system of claim 2, wherein the one or more servers further comprise computer-executable instructions stored on tangible media to:

weight input from the end user based on the current tally of community points, wherein input includes one of upvoting content, downvoting content, upvoting a governance rule, and downvoting a governance rule.

22. The system of claim 2, wherein the one or more servers further comprise computer-executable instructions stored on tangible media to:

responsive to a request from the end user to redeem community points for goods and services on the platform, award the requested goods and services to the end user based on community points in exchange for an amount of community points required for the requested goods and services, wherein goods and services include a special membership subscription, in-platform currency, badges, or animated emojis; and communicate with a virtual machine of the blockchain to record the redemption on the blockchain.

23. The system of claim 2, wherein the one or more servers further comprise computer-executable instructions stored on tangible media to:

award platform-wide programmable tokens and community-specific programmable tokens, wherein platform-wide programmable tokens are usable across communities of the platform and community-specific programmable tokens are usable only in their respective communities, and wherein one or more of the platform-wide programmable tokens and community-specific programmable tokens are usable across different platforms.

24. The system of claim 1, further comprising:

a virtual machine on a Layer 2 of the blockchain, wherein the virtual machine comprises computer-executable instructions stored on tangible media to:

execute transactions for the servers and stand-alone client instances;

validate the transactions by a blockchain consensus mechanism; and record the validated transactions on the blockchain.

25. The system of claim 1, wherein the one or more servers further comprise computer-executable instructions stored on tangible media to:

tally virtual goods given to the end user by other users of the platform;

tally upvotes and downvotes given to the end user by the other users; and compute a value of a contribution allocation corresponding to the end user's contribution to the platform, wherein the contribution allocation is computed based on the tallies.

26. The system of claim 25, wherein the upvotes and downvotes are given for engagements of the end user with the community and thereby are specific to the community.

\* \* \* \* \*